(12) United States Patent
Lawlor

(10) Patent No.: US 6,732,928 B1
(45) Date of Patent: May 11, 2004

(54) SYSTEM AND METHOD FOR APPLYING CODES ONTO PACKAGED PRODUCTS

(75) Inventor: Paul Lawlor, Nottingham (GB)

(73) Assignee: Clarion Limited, Nottingham (GB)

( * ) Notice: Subject to any disclaimer, the term of this patent is extended or adjusted under 35 U.S.C. 154(b) by 372 days.

(21) Appl. No.: 09/705,361

(22) Filed: Nov. 3, 2000

(30) Foreign Application Priority Data

Nov. 5, 1999 (GB) ............................................. 9926198

(51) Int. Cl.[7] ................................................. G06K 7/10
(52) U.S. Cl. ................. 235/462.01; 426/392; 358/1.13; 358/1.15; 235/432; 235/462.13
(58) Field of Search ................................. 235/383, 385, 235/462.01, 462.13, 487, 494, 432; 700/219; 426/392; 358/1.13, 1.14, 1.15

(56) References Cited

U.S. PATENT DOCUMENTS

| | | | |
|---|---|---|---|
| 5,388,384 A | | 2/1995 | Purkey et al. .................. 53/64 |
| 5,600,565 A | * | 2/1997 | Wagner et al. .............. 700/219 |
| 6,347,260 B1 | * | 2/2002 | Grausher et al. ....... 700/219 X |
| 6,426,798 B1 | * | 7/2002 | Yeung ....................... 358/1.13 |
| 2002/0041388 A1 | * | 4/2002 | Aoki .......................... 358/1.14 |
| 2003/0011805 A1 | * | 1/2003 | Yacoub ....................... 358/1.15 |

FOREIGN PATENT DOCUMENTS

| | | |
|---|---|---|
| EP | 0 820 004 A1 | 1/1998 |
| EP | 0 935 187 A2 | 8/1999 |
| JP | 7-334318 A | * 12/1995 |
| JP | 8-295054 A | * 11/1996 |

* cited by examiner

Primary Examiner—Jared J. Fureman
(74) Attorney, Agent, or Firm—Harness, Dickey & Pierce, PLC

(57) ABSTRACT

Codes, such as those representing dates (324), barcodes (326) and incrementing values (325) are applied onto packaged consumer products by a coder (410). The coder receives instructions from a processing system (406) composite data (405) representing information to be coded onto the packaging is received by the processing system (406). Coder instructions for a coder processing subsystem (411) are generated by processing system (406) with reference to coder capabilities (409). In response to these coder capabilities, the processing system (406) either instructs the coder to generate a graphical representation in response to the instructions or assists the coder to generate a graphical representation before supplying lower level instructions to the coder.

28 Claims, 23 Drawing Sheets

| | |
|---|---|
| 1201 | EAN 13 BARCODE PRE-PRINTED ONTO PACKAGING WITH CODE WINDOW |
| 1202 | CODE INTO PRE-PRINTED LABEL WITH<br>_ USE BY DATE (UBD)<br>  =PRODUCTION DATE + 10 DAYS<br>_DISPLAY UNTIL DATE<br>  =UBD - 1 DAY<br>_PRICE DOUBLE HEIGHT |
| 1203 | EXAMPLE:<br><br>| DISPLAY UNTIL | USE BY | PRICE |<br>|---|---|---|<br>| 27 MAR | 28 MAR | £1.95 |<br>     224        225        226<br><br>1101 |

*Figure 12*

| | |
|---|---|
| 1701 | GENERIC FILE 1104 |
| 1702 | .FIELD     "USE BY"<br>.TYPE     :DATE<br>.OFFSET   :10<br>.UNITS    :DAYS<br>.ROUNDING :NONE<br>.PROMPT   :NO<br>.REF      :CURRENT DATE<br>.CALCULATE :YES<br>.[ADDITIONAL PRINT CHARACTERISTICS] |
| 1703 | .FIELD     "DISPLAY BY"<br>.TYPE     :DATE<br>.OFFSET   :-1<br>.ROUNDING :MIDWEEK<br>.PROMPT   :NO<br>.REF      :"USE BY"<br>.CALCULATE :YES<br>.[ADDITIONAL PRINT CHARACTERISTICS] |
| 1704 | .FIELD     "PRICE"<br>.TYPE     :TEXT<br>.SOURCE   :"1-99"<br>.[ADDITIONAL PRINT CHARACTERISTICS] |

| 1801 | GENERIC FILE 1106 |
|------|-------------------|
| 1802 | .FIELD     "NUMBER"<br>.TYPE     :TEXT<br>.SOURCE   :[number]<br>.[ADDITIONAL PRINT CHARACTERISTICS] |
| 1803 | .FIELD     "BARCODE 1"<br>.TYPE     :BARCODE EAN128<br>.SOURCE   :NUMBER<br>.CALCULATE :YES<br>.[ADDITIONAL PRINT CHARACTERISTICS] |
| 1804 | .FIELD     "USE BY"<br>.TYPE     :DATE<br>.OFFSET   :10<br>.UNITS    :DAYS<br>.ROUNDING :NONE<br>.PROMPT   :NO<br>.REF      :CURRENT DATE<br>.CALCULATE :YES<br>.[ADDITIONAL PRINT CHARACTERISTICS] |
| 1805 | .FIELD     "BATCHNO"<br>.TYPE     :COUNTER<br>.STEP     :1<br>.ROLLOVER :RESET AT END<br>.CHAR     :4<br>.START    :0001<br>.END      :0006<br>.PROMPT   :NO<br>.CALCULATE :AT CODER<br>.[ADDITIONAL PRINT CHARACTERISTICS] |

| | |
|---|---|
| 1901 | GENERIC FILE 1109 |
| 1902 | .FIELD      "NUMBER"<br>.TYPE       :TEXT<br>.SOURCE     :"12345"<br>.[ADDITIONAL PRINT CHARACTERISTICS] |
| 1903 | .FIELD      "USE BY"<br>.TYPE       :DATE<br>.OFFSET     :10<br>.UNITS      :DAYS<br>.ROUNDING   :NONE<br>.PROMPT     :NO<br>.REF        :CURRENT DATE<br>.CALCULATE  :YES<br>.[ADDITIONAL PRINT CHARACTERISTICS] |
| 1904 | .FIELD      "CASE NUMBER"<br>.TYPE       :COUNTER<br>.STEP       :1<br>.ROLLOVER   :RESET AT END<br>.CHAR       :4<br>.START      :0001<br>.END        :0144<br>.PROMPT     :NO<br>.CALCULATE  :AT CODER<br>.[ADDITIONAL PRINT CHARACTERISTICS] |
| 1905 | .FIELD      "BARCODE"<br>.TYPE       :BARCODE EAN128<br>.SOURCE     :NUMBER+CASE NUMBER+USEBY<br>.CALCULATE  :AT CODER<br>.[ADDITIONAL PRINT CHARACTERISTICS] |

| | PACKAGING LINE | | |
|---|---|---|---|
| | FIRST CODER | SECOND CODER | THIRD CODER |
| DATES | LEVEL 1<br>CAN CALCULATE DATES | LEVEL 2<br>CAN PRINT DATES FROM STRING | LEVEL 1<br>CAN CALCULATE DATES |
| COUNTERS | LEVEL 3<br>CAN ONLY PRINT BITMAPS | LEVEL 2<br>CAN PRINT COUNTERS FROM STRING | LEVEL 1<br>CAN ONLY PRINT AUTONUMBER |
| BAR CODES | LEVEL 3<br>CAN ONLY PRINT BITMAPS | LEVEL 2<br>CAN PRINT BAR CODE FROM STRING | LEVEL 1<br>CAN ASSEMBLE AND PRINT BAR CODES |
| FONTS | LEVEL 2<br>IN-LINE PRINT ONLY | LEVEL 3<br>CAN ONLY PRINT BITMAPS | LEVEL 1<br>CAN PRINT MANY FONTS IN MANY POSITIONS |

*Figure 23*

SYSTEM AND METHOD FOR APPLYING CODES ONTO PACKAGED PRODUCTS

BACKGROUND OF THE INVENTION

1. Field of the Invention

The present invention relates to applying codes onto packaged consumer products. The present invention also relates to a generic non-coder specific file format to facilitate communication between a first processing device configured to facilitate the design of codes and a second processing device configured to assist with the application of codes onto packages consumer products.

2. Description of the Related Art

For most consumer products, such as perishable products sold in supermarkets etc., there is often a requirement for the product to be marked in some way during a packaging process. Usually, packaging for individual products will be printed using sophisticated printing techniques so as to appeal to the eye of the consumer. It is therefore common practice for packaging of this type to include unique information, usually represented in the form of a bar code, identifying a specific product, thereby allowing products to be scanned at a checkout in preference to price information being entered manually. Consequently, this product identification code, as applied to the individual consumer products, may be created offline during the printing of the consumer product packaging.

In addition to the product identification markings, products often require other forms of marking, often in the form of dates and prices. In response to market conditions, prices may need to change, therefore it is preferable that any price information is not pre-printed onto consumer products. The price information may be considered as being date sensitive and therefore it is preferable for this information to be applied to the products after manufacture.

There is often other date sensitive information printed onto products, typically in the form of a display until date and a use by date. The display until date identifies the last day on which the product may remain on display on supermarket shelves. After this day the product may be removed from the shelves or reduced substantially in price. Similarly, the use by day is the last day on which the consumer may be reassured that the product is still sufficiently fresh to be consumed. Thereafter, unless the product has been frozen etc., the product may no longer be suitable for consumption and should therefore be destroyed.

Many products packaged in this way have a relatively short shelf life therefore it would not be possible to print this information as part of the offline package printing process. It is therefore necessary to code this information onto products at some point between the products being manufactured and the products being further packaged for distribution to wholesalers and supermarkets etc. in the form of traded units.

Often traded units are constructed from assemblies of consumer products, each of which may have many consumer products contained therein. It is not therefore unusual to have three or more stages of packaging and at each stage of packaging there is a further requirement for information to be coded onto the packaging itself.

Often, subsequent packaging materials are not printed for a specific product, given that this would require large quantities of material to be held in stock. Consequently, it is necessary for product related information to be coded onto these packaging materials again during the packaging process. This information, may comprise an indication of the product itself, an indication of batch number, a unique number identifying the position in the batch, i.e. an incrementing lot number, a display until date, a use by date and possibly a unit price. In order to achieve this, there are many types of coding apparatus available on the market and it is common practice for these, to be arranged in a line such that consumer products are manufactured, the consumer products are coded, the coded products are arranged as assemblies, the assemblies are coded, the assemblies are packaged in to traded units and finally the traded units are coded, as a continual manufacturing process.

Increasingly, supermarkets and wholesalers etc. are specifying the type of information that they require to be coded onto packaging at various stages, It is also likely that a manufacturer would suffer significant penalties were the coded information to be incorrect in any way. Consequently, a substantial burden has been placed on manufacturers to ensure that products are coded as required.

Traditionally, instructions are supplied to coding equipment manually such that, for the start of each batch, it would be necessary for all online coders to be manually updated in this way. Furthermore, modifications may be required during the packaging process, particularly for large batches, where date information and lot increments may change over time. Consequently, it has been recognised that it is preferable to connect coders together over a network so that they may receive instructions electronically from a processing system, such as one or more PC type computer systems. It would be desirable for an originator of a coded graphical representation to design this graphical representation within a conventional graphics package and then for this information to be supplied to packaging coding machines in a way substantially similar to that in which information is conveyed from computer systems to traditional office type printers. However, whereas printers have substantially similar functionality and capabilities, all of which are often designed to compatible standards, such as those capable of working under the Windows operating system, coders are significantly different in that they are produced by many manufacturers using their own in-house standards. Furthermore, the functional capabilities of coders are not consistent.

In order to provide an environment in which instructions from a processing system may be supplied to any coder within a manufacturing facility, it has been suggested that a processing system could be responsible for the generation of all graphical information and then supply this graphical information to all coders in the form of bitmaps. However, the speed at which most coding operations are performed, particularly when individual consumer products are being coded, prevents this approach from being adopted and it is therefore necessary to rely on processing capability built into the coder itself. Consequently, it becomes extremely difficult to network coders of this type unless individual coder specific software is created for each individual packaging station. Often, this is an unrealistic solution and therefore a reliance on manual intervention continues to be prevalent.

A further problem arises if conventional graphical packages are used to generate graphical information. The graphical information produced will be in the form of a bitmap or, alternatively, in some form of compressed representation. Once converted into one of these graphical forms, the underlying information about dates and barcodes for example is lost. Subsequently, it is only possible for coders to reproduce this graphical information and it is not possible for them to receive the underlying information so that use may be made of their internal capabilities. As previously stated, this becomes an unrealistic solution given the underlying requirements for speed of operation and reliability.

BRIEF SUMMARY OF THE INVENTION

According to the first aspect of the present invention, there is provided an apparatus for applying codes onto packaged consumer products, wherein said products are packed individually and then further packed into groups of products; at least one coder applies information to said packaging; said coder receives instructions from a processing system; said processing system receives graphical data representing an image to be coded onto said packaging and generates said instructions for said coder, wherein said processing system generates said instructions with reference to the capabilities of said coder such that, in dependence upon said capabilities, said processing system either a) instructs said coder to generate a graphical representation in response to coded instructions, or b) said processing system generates a graphical representation of said image and supplies said graphical representation to said coder.

By being made aware of the capabilities of a coder type, it is possible for a processing system to make use of internal capabilities when these are available, while filling in for less functional coder capabilities when these capabilities are not available.

According to a second aspect of the present invention, there is provided a method of communicating between a first processing device configured to facilitate the design of codes for packaged consumer products and a second processing device configured to control coding machines for coding said packaged products in response to said design, wherein data transmitted from said first processing station to said second processing station defines said codes in a generic non-coder specific format defining a requirement for said codes; and said second processing device is aware of coder capabilities and instructs specific coders to apply codes in response to a generic code design and a definition of capabilities for a specific coder.

BRIEF DESCRIPTION OF THE SEVERAL VIEWS OF THE DRAWINGS

FIG. 12 illustrates a first written specification of the type shown in FIG. 11;

FIG. 17 shows a first generic code file of the type identified in FIG. 11;

FIG. 18 shows a second generic code file of the type identified in FIG. 11;

FIG. 19 shows a third generic code file of the type identified in FIG. 11;

FIG. 23 illustrates the processing capabilities of the coders shown in FIG. 7.

BEST MODE FOR CARRYING OUT THE INVENTION

Figure 1:
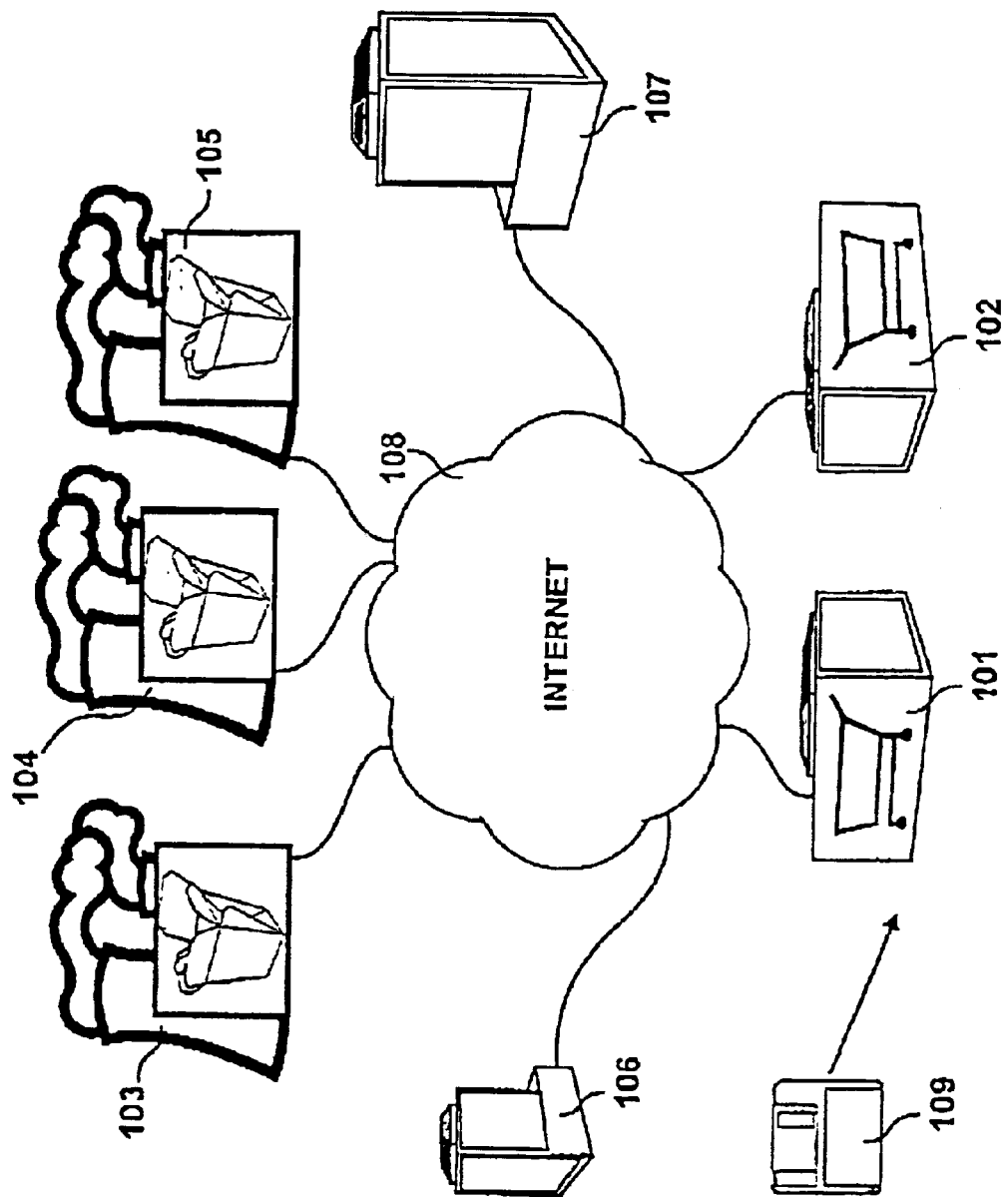
FIG. 1 shows and environment for the manufacture, packaging, distribution and retails of consumer food products.

An environment for the manufacture, packaging, distribution and retail of consumer food products is shown in FIG. 1. Consumer products, such as perishable foodstuffs etc. are sold at a first supermarket 101 and at a second competing supermarket 102. A first production facility 103, a second production facility 104 and a third production facility 105 each manufacture consumable products that are sold to both supermarkets 101 and 102. The nature of the products themselves may be substantially similar thus, in this example, it is assumed that all three factories 103 to 105 produce similar bottled product for both supermarkets 101 and 102. However, the supermarkets require their own distinct packaging and have different preferences for the layout of codes coded onto said packaging, both in the form of individual consumer products and packaged assemblies of these products. Traditionally, each facility 103 to 105 has coding equipment that would have been manually programmed at each individual location. In the environment shown in FIG. 1, apparatus embodying the present invention has been installed so as to facilitate the programming of coders, thereby reducing overhead and increasing reliability.

A coding bureau 106 provides a service of generating generic code defining instructions that are then interpreted locally with reference to the locally available coders. Information relating to the operation of specific coders is received by the coding bureau from the manufacturers 107 of the coding equipment. In the example shown, communication between the entities is effected over the Internet 108. Alternatively, specifications for coded graphics may be sent to bureau 106 by more traditional means and the coding instructions themselves could be despatched on a code carrying medium 109, such as a floppy disc, a high capacity disc, tape or a CD ROM etc. Alternatively, software for the generation of the coding instructions, generated in response to operations performed upon a graphical user interface, may be licensed by the bureau 106 to the supermarkets, thereby allowing supermarket staff, or staff at a head office, to create the instructions in-house.

Figure 2:
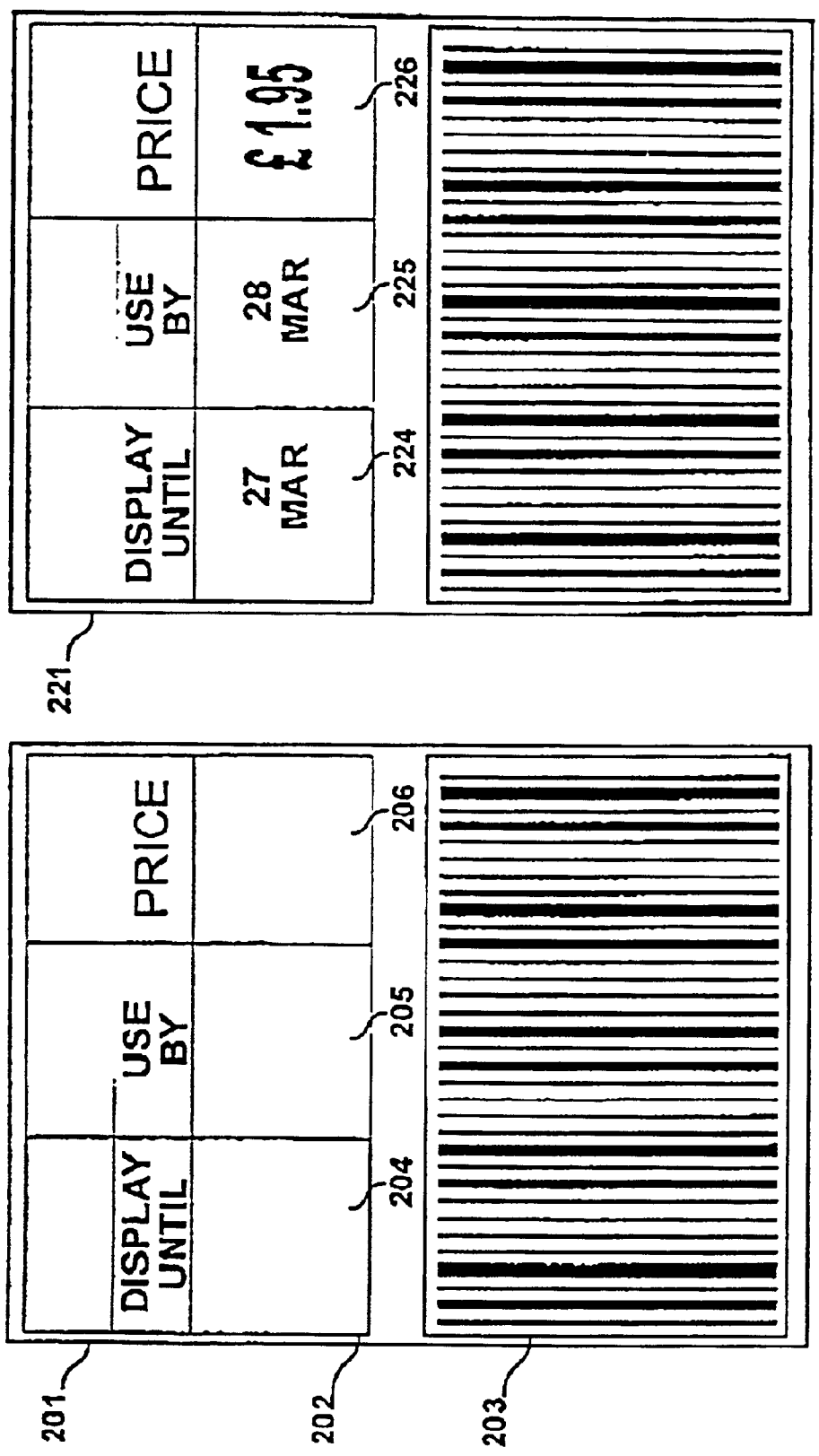
FIG. 2 shows an example of a label for a consumer product.

An example of a label for a consumer product is shown in FIG. 2. A label 201 is printed with a grid 202 and a barcode 203. In addition, lithographic techniques would be employed to print other items onto the label 201, possibly showing a photograph of the product contained therein. The grid 202 includes a portion 204 into which a display until date is coded therein, a portion 205 into which a use by date is coded therein and a portion 206 into which a price is coded therein. A barcode 203 is printed by the lithographic printing process and, in accordance with established standards, provides a unique identification for the particular product.

FIG. 2 also shows a second label 221 after the coding operation. Thus, a date 224 has been coded in portion 204, representing the display until date, a second date 225 has been coded into portion 205, representing a use by date and a price 226 has been coded into portion 206.

Figure 3:
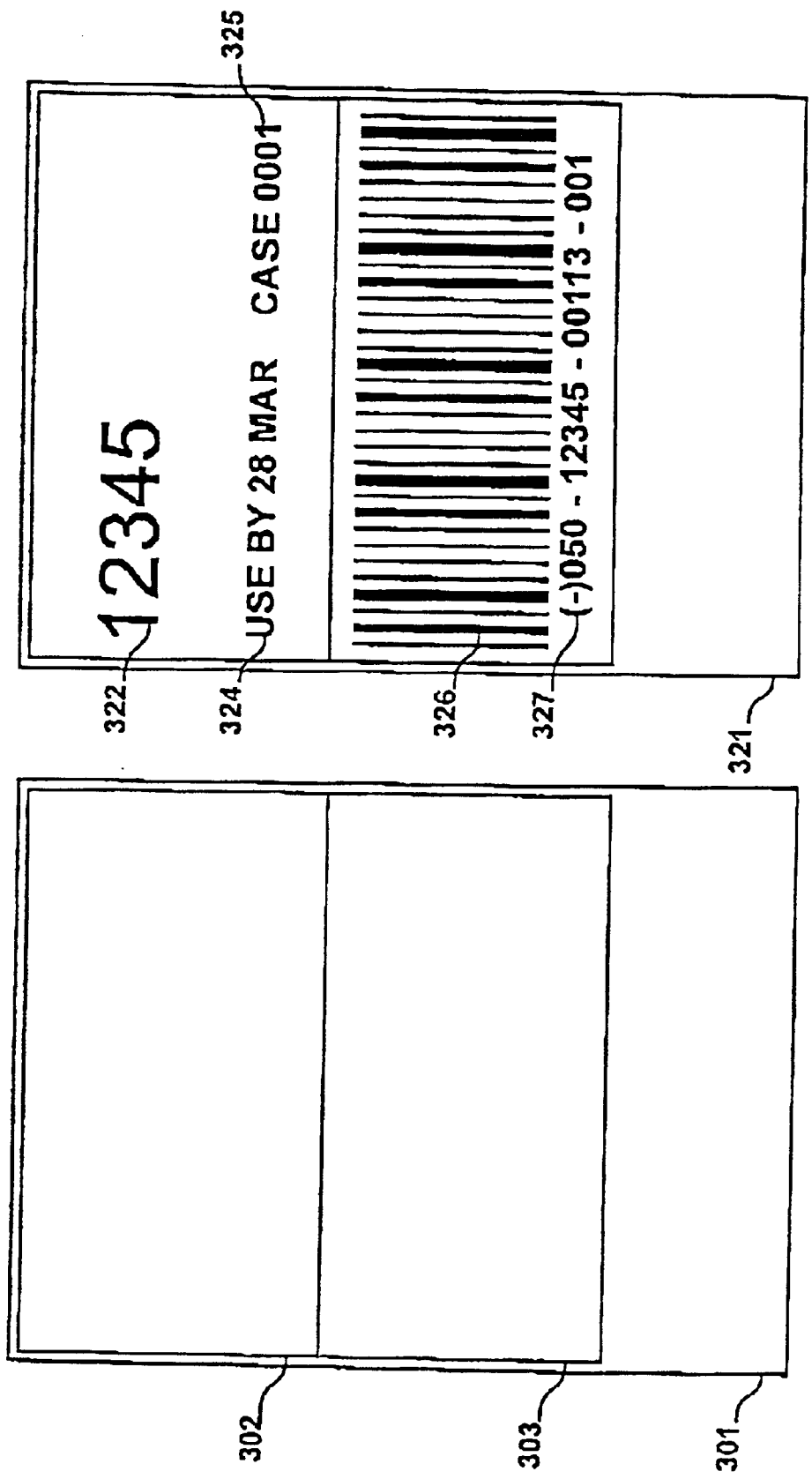
FIG. 3 shows an example of a label for an assembly of consumer products packaged as a unit.

During the packaging operation, individual consumer products are packaged in bulk to produce larger assemblies. At the supermarket, these assemblies are handled by supermarket operatives and as such the supermarket, often using international standards, has specified how labels are to appear for these assemblies, as illustrated in FIG. 3.

Initially, printed labels 301 contain very little and do not include any product specific information. Consequently, if this information is required, it must be coded after the assemblies have been put together. The label 301 includes a first portion 302 and a second portion 303.

Requirements for coding are illustrated in a second label 321, in which alpha numeric information has been coded in portion 302 and a barcode has been coded in region 303.

The alpha numeric information includes a number 322 identifying the actual product. This information may be supplied as part of a graphical representation or, alternatively, it may be derived during production either manually, by selecting what is to be coded, or by reading the barcode 203 on the previous level of packaging.

The information also includes details of the use by date 324, which must be consistent with the use by date coded on the consumer products 225 contained therein. The information also includes an incrementing lot number 325, which, in this example, shows that the assembly is case number 0001. Thus, when the next case is assembled, this should be identified as case 0002 and these numbers must increment as each case is assembled.

A barcode 326 is printed in region 303 which, in addition to having machine readable bars, also includes a numerical representation 327 of the barcoded data. The barcode 326 and the numerical data 327 therefore represent two modes of conveying the same information. This includes a representation of the source of manufacture, a representation of the product type, substantially the same as that coded at 322, an identification of the day of the year, generated with reference to a clock and a representation of the unique identifier, ie that coded at 325. Thus, the generation of barcode 326 requires sophisticated processing. The first portion, identifying the manufacturer, would remain constant for each manufacturer. Thus, facility 103 may be represented by code 050, facility 104 may be represented by code 051 and facility 105 may be represented by code 052.

The particular product is identified by code 12345 and this would need to change when different products were being packaged. The day is represented by the number of the day in the year and in this example, the unique day number is identified as 00113. Thus, this information requires a real time clock for its generation and it must then be incorporated into the numerical code 327 and into the barcode 326. This in turn will require processing for the rendering of the barcode 326. Finally, the case number is included, shown as 001 in this example. Thus, each time a coding operation has been performed, a new coding graphic must be generated taking account of this incremental change.

The labels illustrated in FIG. 2 and FIG. 3 may be considered as defining a label specification. These details may be sent to bureau 106 in paper form and the bureau 106 is then responsible for the generation of instructions for driving the actual coders.

Figure 4:
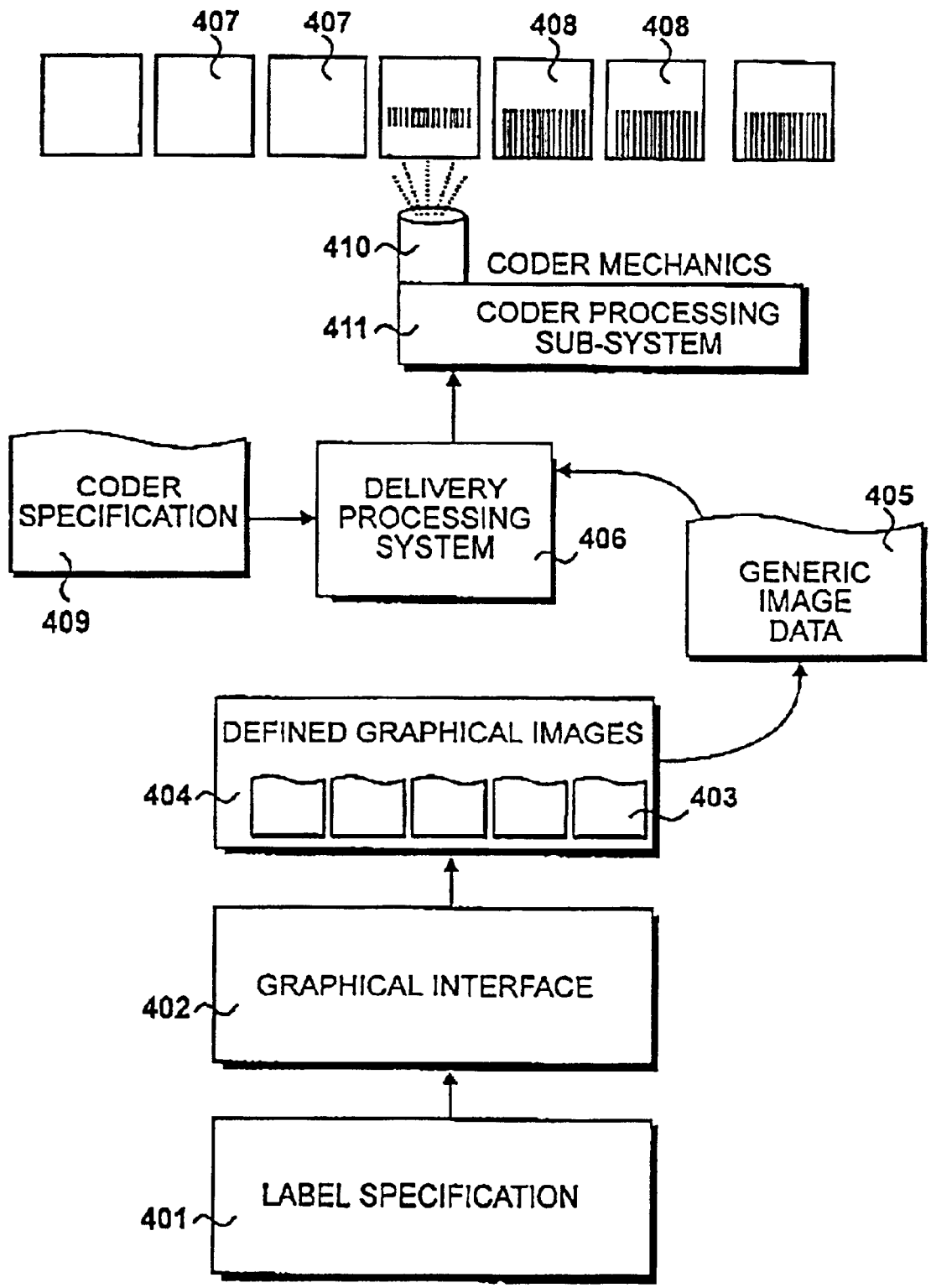
FIG. 4 illustrates an overview of important operations performed by the preferred embodiment.

As illustrated in FIG. 4, step 401 initiates the process of label specification. Thus, a supermarket may convey this label specification 401 to the bureau 106. At the bureau 106, the label is generated in machine readable form via a graphical interface 402. This produces computer files 403 that collectively may be considered as defining graphical images in a generic coding format. These defined graphical images, in the generic format, are supplied, possibly over the Internet, to the manufacturing factories 103 to 105.

At facilities 103 to 105, a delivery processing system 406 is responsible for receiving the graphical image data in files, such as file 405. The delivery processing system 406 is then responsible for supplying coder specific instructions to a coder to enable it to code uncoded products 407 to produce coded products 408. The delivery system receives a coder specification 409 thereby enabling it to convert the generic coding data into coder specific data. The coder itself includes coder mechanics 410 in combination with a coder processing sub-system 411. The coder specification 409 informs the delivery system 406 as to the capabilities of the coder processing sub-system 411. Thus, the delivery processing system 406 receives graphical data representing an image to be coded onto packaging 407.

The delivery processing system 406 generates instructions for the coder with reference to the capabilities of the coder, defined by the specification 409. In dependence upon these capabilities, the delivery processing system 406 may instruct the coder to generate a graphical representation in response to coded instructions. This is possible when the functionality required may be provided by the coder processing sub system 411. Alternatively, if the coder processing sub system 411 is not capable of is providing the functionality required, the delivery processing system 406 makes up for this inadequacy by generating a graphical representation of the image such that this graphical representation is then supplied to the coder processing sub system.

Generic files are generated within a computer-based system that has been tailored specifically for the generation of information of this type. Consequently, it does not represent the information merely as a graphic but describes it in such a way that subsequent processing facilities may reconstitute the underlying information, taking forms that commonly include dates, incrementing numbers and barcodes etc. In this way, it is possible for coders to receive instructions so that maximum benefit can be gained from their internal resources. Thus, for example, if a coder has a real-time clock and is capable of producing a date by adding an increment to its real-time clock value, it is preferable for use to be made of this facility and for the coder to be instructed to perform the coding using its own internal capabilities. However, this same generic information may be exploited in situations where coders do not have this level of internal functionality. Under these circumstances, local additional processing capability, responsible for programming the coders, provides the missing level of functionality. Thus, if a coder is not capable of calculating a data, it would be possible for the processing facility to provide date information of the form "print the date in this format" with the calculation of the increment being performed by the processing system. Furthermore, if the coder is not capable of understanding date information, it will be possible for this gap to be filled in by the processing system generating a data graphic in the form of a bitmap and then downloading the bitmap. Thus, the generic information may be sent to all coders and the local delivery system will perform necessary conversions and additional processing in order for the coded information to be conveyed to the coder itself without the initial specification needing to know the actual type of coder that will ultimately reproduce the coded graphic.

Figure 5:
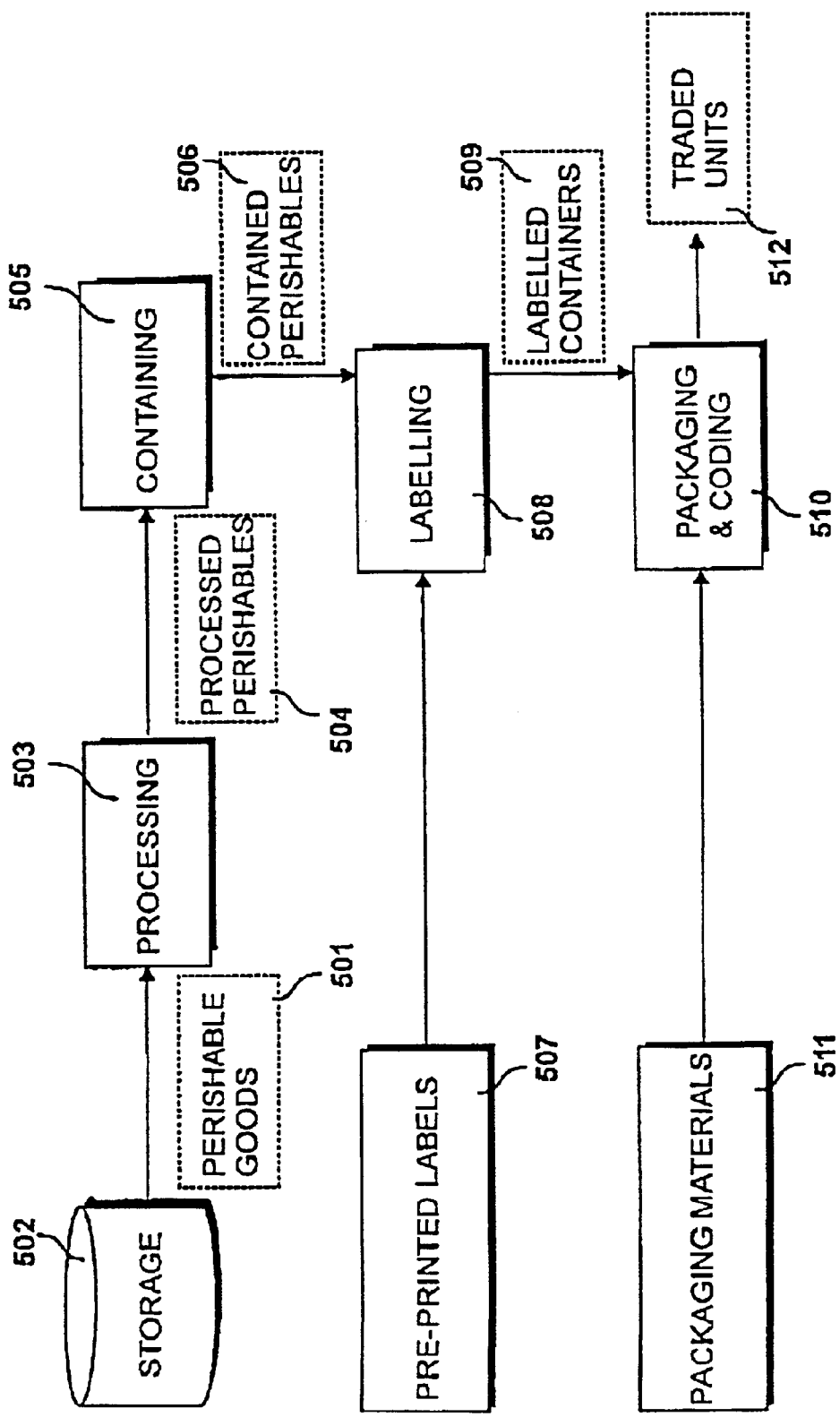
FIG. 5 shows a production facility for the packaging of perishable consumer products.

Production facility 103 for the packaging of perishable consumer products is illustrated in FIG. 5. The facility produces products that have a very short shelf life, such as fresh meat and vegetables etc and a typical example would be the packaging of milk products. The environment is also applicable to perishable products that have a relatively longer life, such as bottled sauces, carbonated drinks and tinned meats etc. Increasingly, whether due to legislation or due to contractual terms insisted upon by wholesalers and retailers, perishable products are required to include date codes, usually representing the date by which the product must be sold and/or the date by which the produced should be consumed. These are commonly referred to as sell by dates and use by dates respectively, or also by display until dates and best before dates respectively.

Most consumer products undergo several stages of packing such that, for example, end user consumers would purchase individual consumer products, with each individual consumer product conveying sell by and use by dates. A retailer, however, would usually purchase a packaged collection of these products and again wholesale packages would be expected to include sell by and use by dates. Similarly, wholesalers would tend to purchase even larger traded units of products and again at this stage the large traded unit would be required to include use by and sell by dates. Throughout the process, these use by and sell by dates relate to the dates applicable to the consumer products and therefore the dates and any other identifications coded onto the products must be consistent.

Referring to FIG. 5, perishable goods 501 are stored in storage devices 502 and conveyed to a processing system 503. The processing performed by processing system 503 may be relatively modest, such as the pasteurising of milk etc or may be relatively sophisticated, such as that required when producing convenience "ready meals".

The output from the processing process 503 results in the establishment of processed perishables 504. These processed perishables 504 are then supplied to a containing process 505 to produce contained perishables 506.

At this stage, it is common practice for the contained perishables, such as sauce contained within glass bottles or a ready meal contained in a micorwavable tray, to have a label applied thereto. Thus, pre-printed labels 507 are supplied to a labelling process 508 resulting in the production of labelled containers 509.

The pre-printed labels 507 are produced using conventional printing techniques and are generally printed to a very high level of quality, often including trademarks, logos and full colour graphics etc. Labelled containers 509 look almost identical to the actual consumer products that will be purchased by consumers. Pre-printed labels 507 often include barcodes that have been allocated to the product so that it may be identified by a unique reference number. However, the display by and use by data cannot be printed onto the pre-printed labels because for some products the period of time between manufacture and consumption is relatively short. Thus, for example, after a product has been manufactured the dates may be calculated such that the product may be displayed for nine days and then consumed within ten days. Consequently, it is necessary for this information to be coded during the manufacturing process.

Contained perishables are labelled by labelling process 508, receiving pre-printed labels 507, to produce labelled containers 509. Labelled containers do not include any coded information. The labelled containers 509 are provided to a packaging and coding process 510 configured to receive packaging materials 511 so as to code and package the labelled containers. The packaging and coding process 510 produces traded units 512 suitable for being dispatched from the facility 103 to the supermarkets 101, 102.

Figure 6:
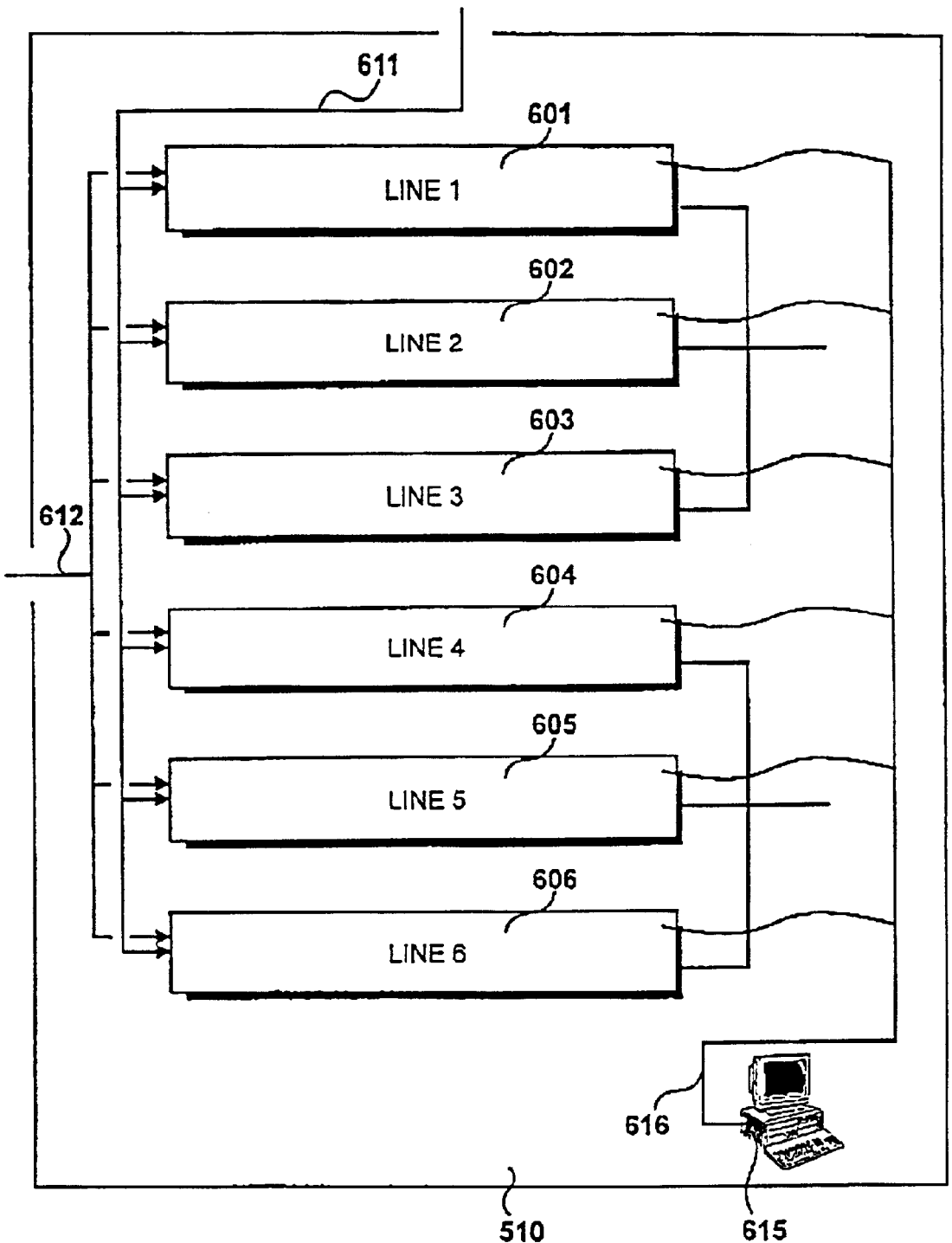
FIG. 6 details the packaging and coding process identified in FIG. 5.

Packaging and coding process 510 is detailed in FIG. 6. The facility includes, in this example, six lines 601, 602, 603, 604, 605 and 606 capable of operating in parallel. Each line 601 to 606 receives labelled containers 509, illustrated by input conveyor 611 and receives packaging materials 511, illustrated by input conveyor 612. In addition to packaging apparatus, the lines include coding apparatus for coding items at their various packaging stages. These coding apparatus perform printing operations, using various printing technologies and are collectively referred to as coders. These coders must perform their printing operations so as to convey real-time image data upon perishable consumer items or upon collections of said items. The coding operation must also maintain consistency between images applied to individual items and the images applied to the collections of items.

Figure 7:
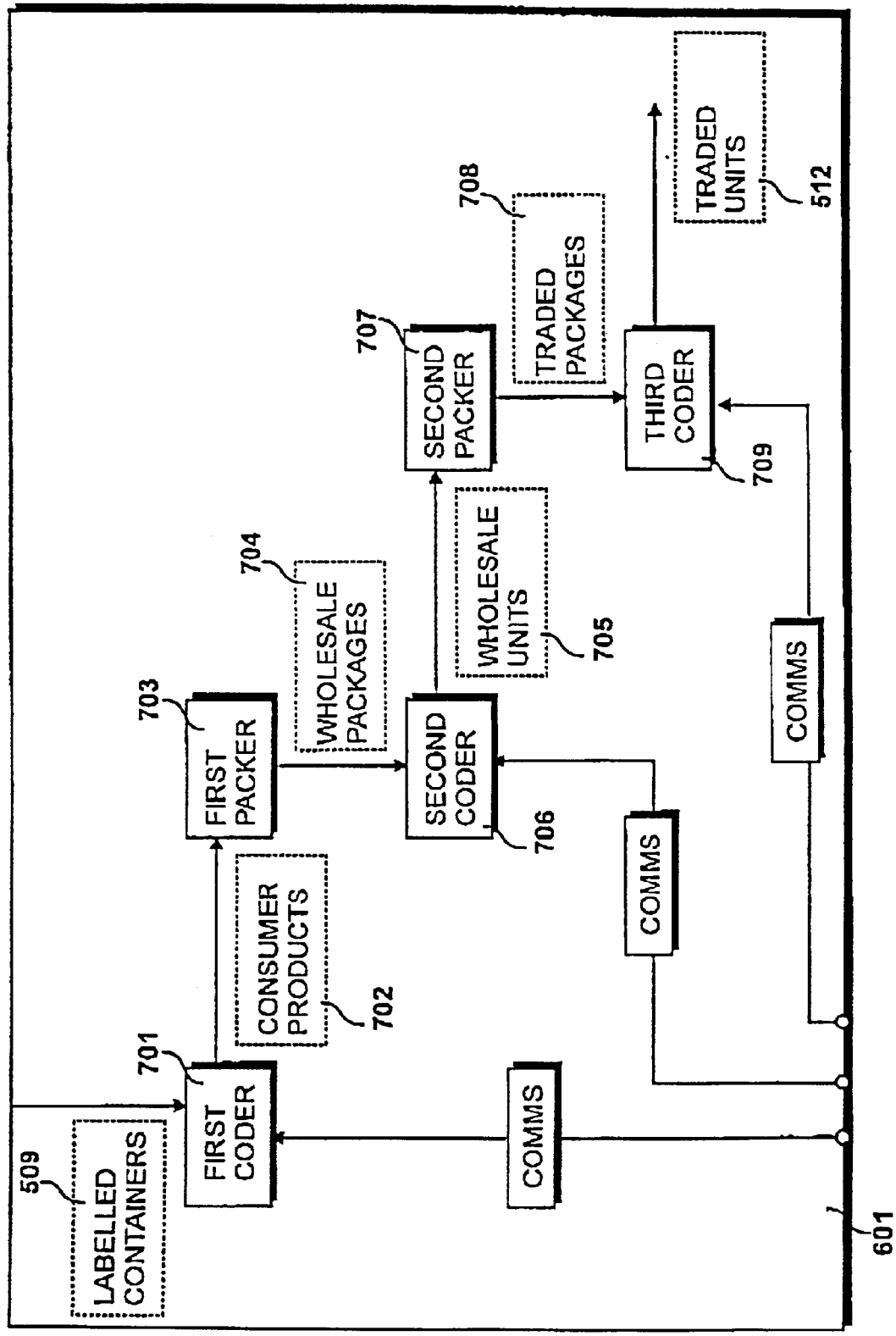
FIG. 7 details the packaging line identified in FIG. 6.

As is known in the art, the individual coders may each receive manual input instructions. However, in accordance with an embodiment with the present invention, the coders are controlled by a centralised coder control computer 215 in order to co-ordinate the overall operations of the system. The control computer 215 is connected to each of the lines 201 o 205 via a local area network 216, using an appropriate local network protocol, such as TCP/IP, with suitable communications protocol converters, Packaging line 601 is detailed in FIG. 7. Labelled containers 509 are supplied to a first coder 701. The first coder 701 prints a first code onto the labelled containers 509 that includes date information. The date information may represent a sell by date and in addition thereto, it may also include a use by date. The printed information may also include an identification of the particular batch from which the product was derived, along with any other information which may be considered relevant. However, it should be appreciated that this printing exercise is performed as part of the in-line packaging operations and essentially relates to real-time data specific to the particular batch and the date of production.

When the labelled containers 509 have been coded in this way, by the first coder 701, this results in the production of consumer products 702 of the type that could be placed on retail shelves. However, although satisfying all statutory and contractual requirements, the individual consumer products 702 need to be transported and, as such, are themselves packaged primarily for transportation purposes.

For the purpose of this description, it should be understood that the "containing" of a product is such as to enable a consumer to purchase a product from a retailer. As used herein, the "packaging" of these individual consumer products relates to the creation of assemblies and traded units for the transportation of products between the manufacturer and the end user consumer.

A first packer 703 receives consumer products 702 and packages a plurality of such products together to produce wholesale packages 704. In this example, the wholesale packages are intended for distribution from a wholesaler to a retailer, for example and as such require coding to be applied thereto to produce actual wholesale units 705, that would be considered acceptable to the wholesaler. It is therefore necessary for a second coder 706 to again print information onto the wholesale packages 704 to produce wholesale units 705. Again, this coded information is date related information and this date related information is in turn consistent with the date information applied by the first coder 701.

In this example, the wholesale units are supplied to a second packer 707 to produce traded packages 708, of the type often constructed around a pallet for easy transportation from the manufacturer to the wholesaler. However, in this form they would not be acceptable to wholesalers given that, again, date specific information needs to be applied thereto. Consequently, a third coder 709 applies date specific information to the traded packages 708 to produce traded units 512. Again, the information contained on the traded units 512 is consistent with the information coded onto the wholesale units 705 which in its turn is consistent with the information coded onto the consumer products 702.

The information generated by each of the coding processes is substantially similar in terms of its information content. Furthermore, the consistency of this information must be maintained.

Figure 8:
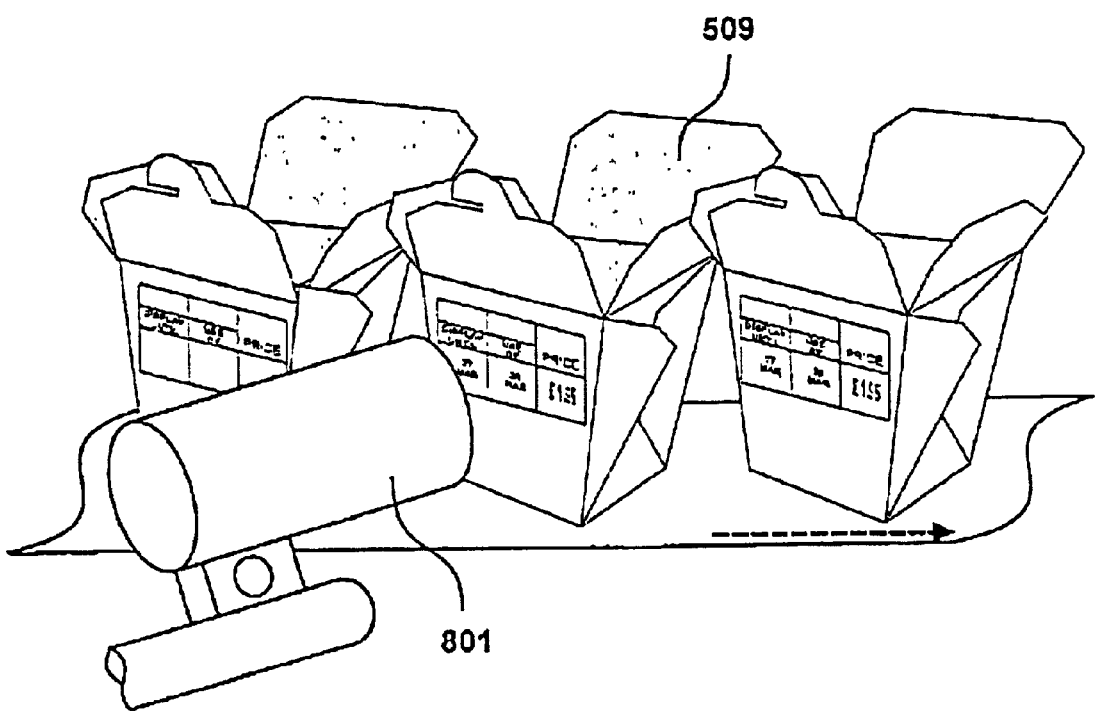
FIG. 8 shows a first coder of the type identified in FIG. 7.

First coder 701 is detailed in FIG. 8. A nozzle 801 directs ink droplets onto labelled containers 509 to produce high resolution characters upon the labelled containers 509. The coder produces a good quality image on the individual items at high speed. It is also capable of responding to date related instructions with reference to its own internal real-time clock. Thus, it is possible to instruct the coder to print a date based on the actual date plus an increment defined in terms of several days. This provides a preferable approach compared to providing the coder with bitmap data, which would need to be resubmitted to the coder during each day. Unless the equipment is temporarily halted for downloading processes, the downloading of bitmap data may result in coding operations being missed for particular consumer products; a possibility that would not be considered as acceptable.

Figure 9:
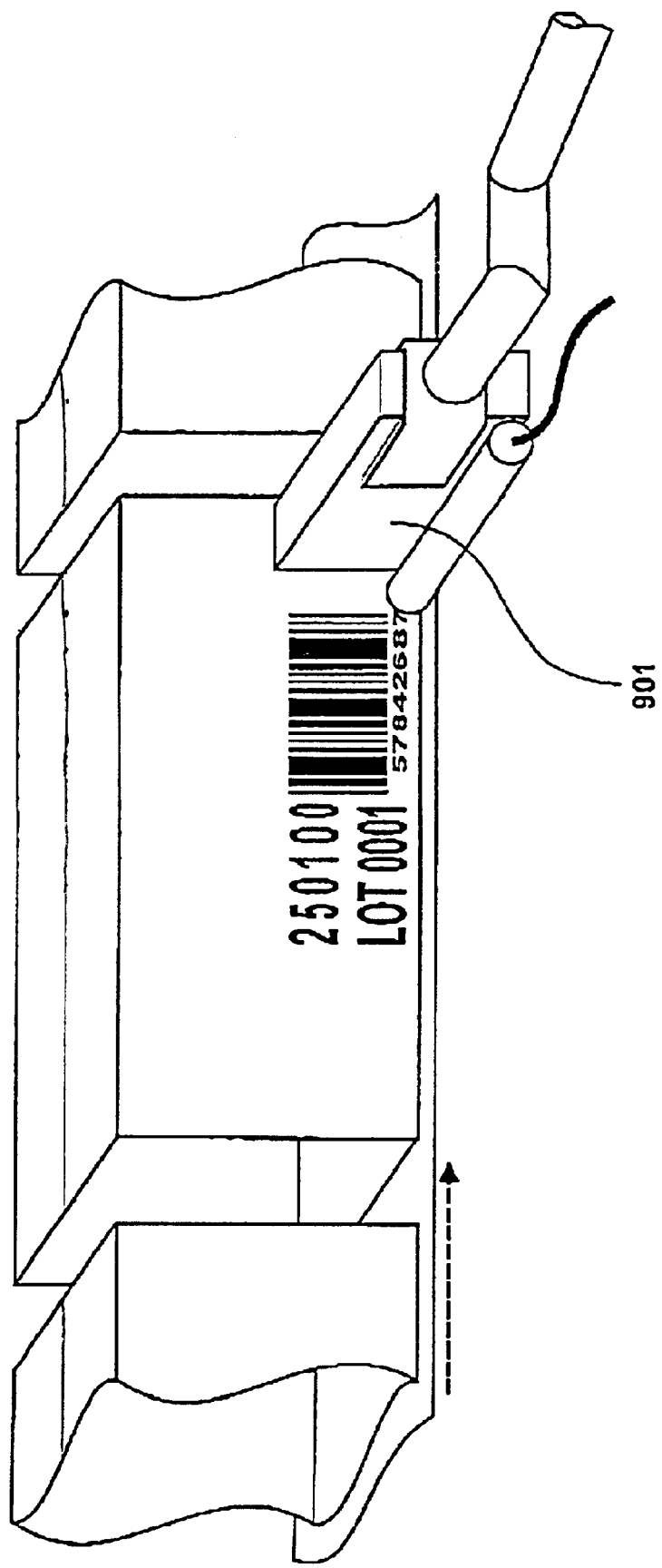
FIG. 9 shows a second coder of the type identified in FIG. 7.

A second coder 706 is detailed in FIG. 9. An ink jet printer 901 is particularly suitable for the printing of barcodes on large porous surfaces. It includes local functionality that is capable of generating a barcode in response to receiving purely numerical information. However, the definition of the barcode, as a numerical string, must be supplied to the coder in full, given that the coder does not include the functionality to calculate barcodes with variables defined therein, requiring, for example, an input from an internal clock. This particular coder does not include any internal timekeeping facilities, therefore, it is necessary to update image data supplied to the coder when date/time changes are required.

Figure 10:
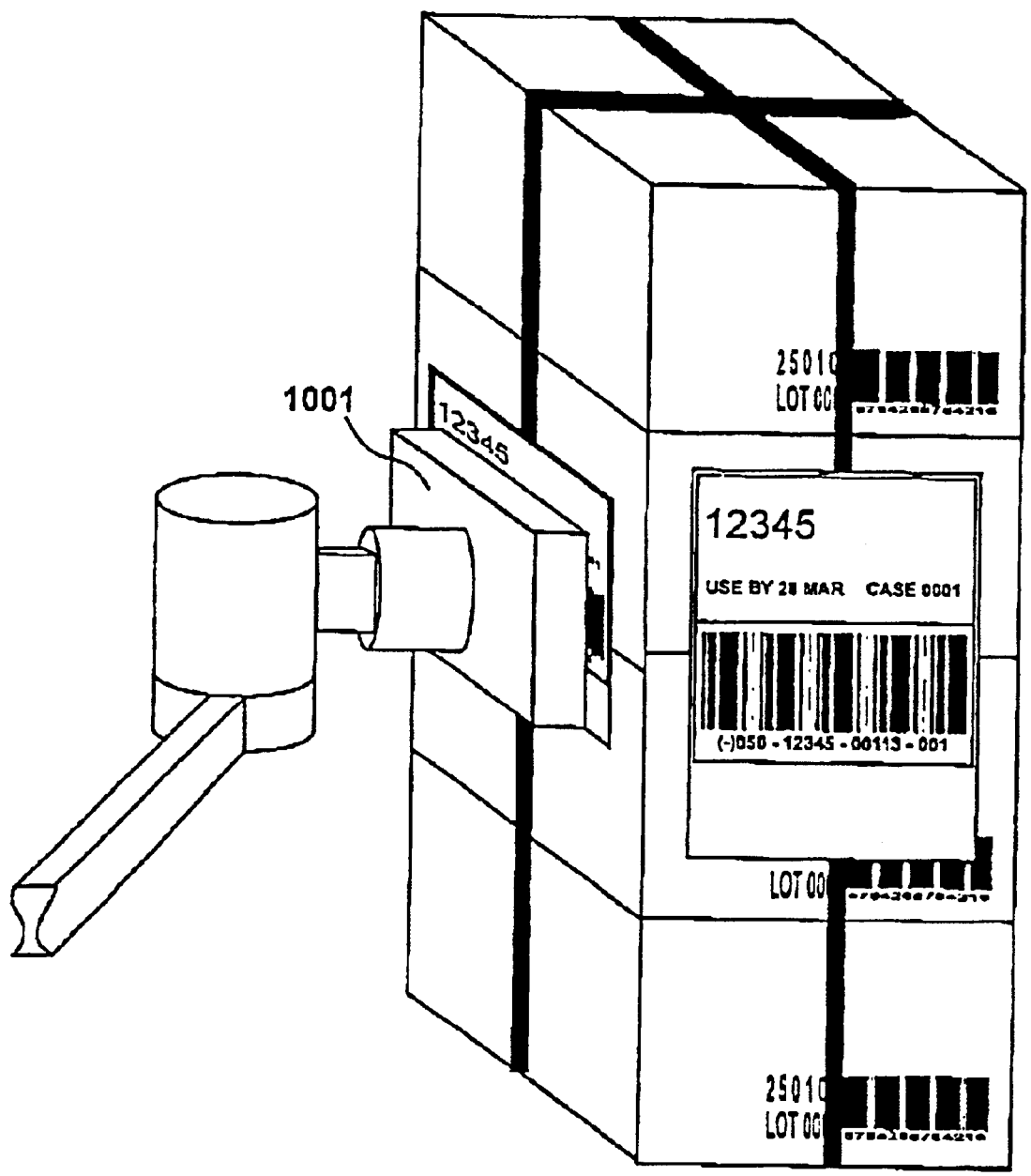
FIG. 10 shows a third coder of the type identified in FIG. 7.

A third coder 707 is detailed in FIG. 10. Coder 1001 prints, applies and verifies labels. The labels include barcodes and given that the printing process occurs to the label before it is applied to the traded package, the barcodes may be printed with a relatively higher degree of accuracy. Again, the coder includes functionality for rendering barcodes in response to numerical data, so its specifications with respect to the generation of barcodes for traded units may be considered to be of a relatively high quality. In addition, it is possible for barcodes to be generated internally by definitions that include variables such that information calculated by the processing capabilities of the coder itself may be included within the information conveyed by the barcode. In this respect, it may be assumed that the inclusion of barcodes on traded units is an essential component which assures that the traded units are handled in a very efficient manner. In particular, wholesalers would not accept traded units if barcodes of this nature, or other means of containing the same information, such as RF tags, were not included.

In addition to including functionality for the automatic generation of barcodes, the third coder 1001 also includes functionality for the automatic generation of dates. Thus, it is not necessary to continually update image data supplied to the third coder 1001, given that, in response to instructions including a date code function, dates and times are updated with reference an internal real-time clock.

Figure 11:
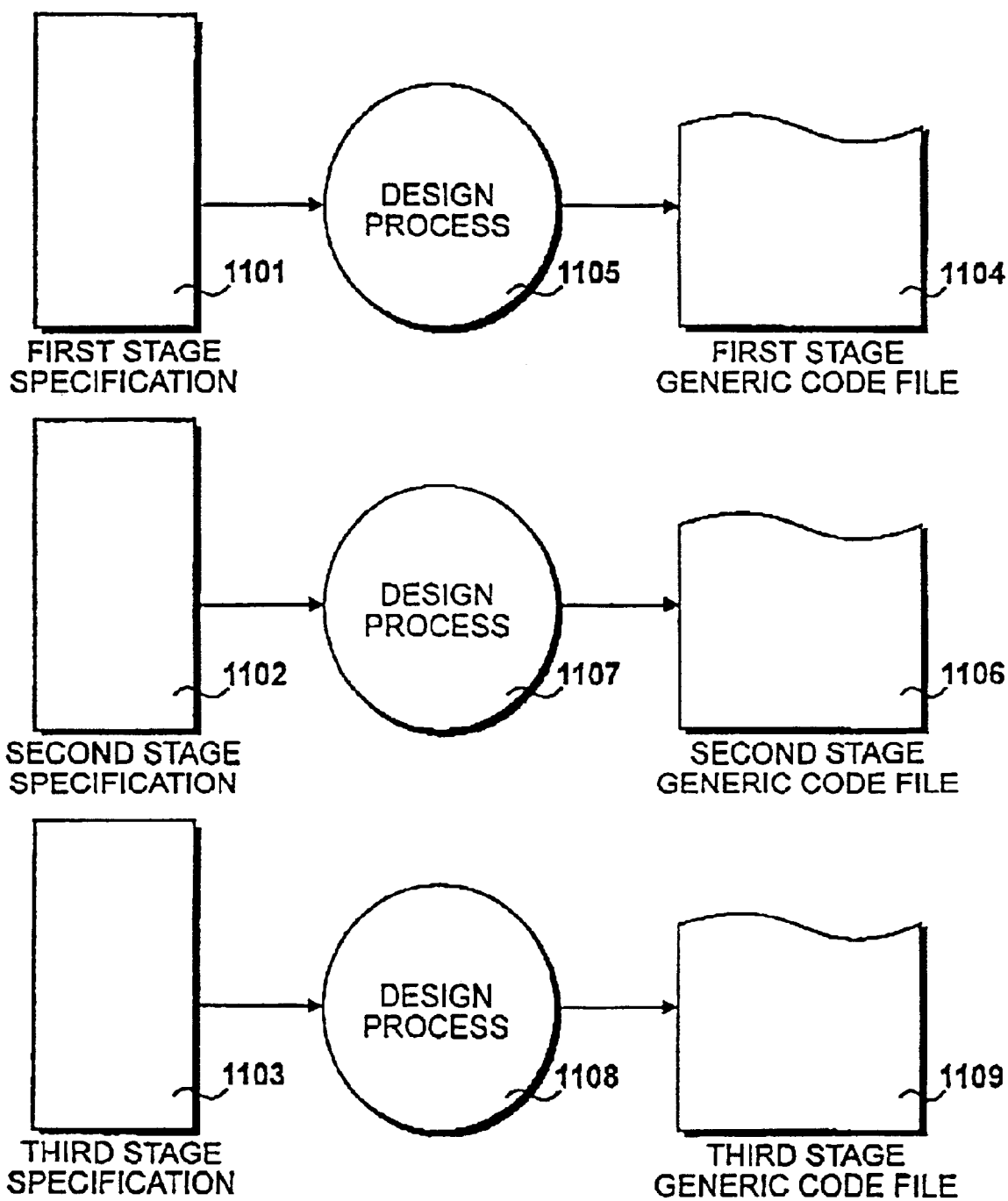
FIG. 11 illustrates the processing of generic code files from written specifications.

As shown in FIG. 4, a label specification is generated from which graphical images are defined as generic image data files facilitated by a data processing system presenting a graphical user interface 402. As shown in FIG. 11, for line 601, consisting of a first coder 701, a second coder 706 and a third coder 709, it is necessary to produce graphical image specifications for each of these coders. These take the form of a first stage specification 1101, a second stage specification 1102 and a third stage specification 1103. The first stage specification 1101 is applied to a design process to produce a first stage generic code file 1104. Similarly, the second stage specification 1102 results in the production of a second stage generic code file 1106 via design process 107. Finally, a design process 1108 is performed with respect to the third stage specification 1103 to produce a third stage generic code file 1109.

The first stage specification 1101 is illustrated in FIG. 12. At 1201 a barcode is specified of type EAN13, identifying the particular type of product This barcode is not coded, by the online coder 701 but is pre-printed onto the labels at 507.

Secondly, as identified 1202 a code is coded by coder 701 taking the form of a use by date 225, a display until date 224 and a price 226. The specification also states that the use by date should be equal to the production date plus ten days and that the display until date should be equal to the use by date minus one day. Furthermore, the specification states that the price text should be printed at double height An example of the graphic to be coded is then give at 1203 and is substantially similar to the example given in FIG. 2.

Figure 13:
FIG. 13 shows a second written specification of the type shown in FIG. 11.

Second stage specification 1102 is detailed in FIG. 13. At 1301 it is stated that the product number should be coded in text, this being the same product number identified by the barcode specified at 1201.

At 1302 it is specified that the product number should also be represented as a bar code, therefore this barcode is effectively equivalent to the barcode specified at 1201.

At 1303 a use by date is specified, taking the form of two digits for the day, two digits for the month and two digits for the year.

At 1304 a batch number is specified, taking the form "LOT" followed by four incrementing digits.

An example is then given at 1305 showing how the information is to be assembled on the label.

A note is made at 1306 to the effect that this packaged article will contain twenty-four individual consumer products.

Figure 14:
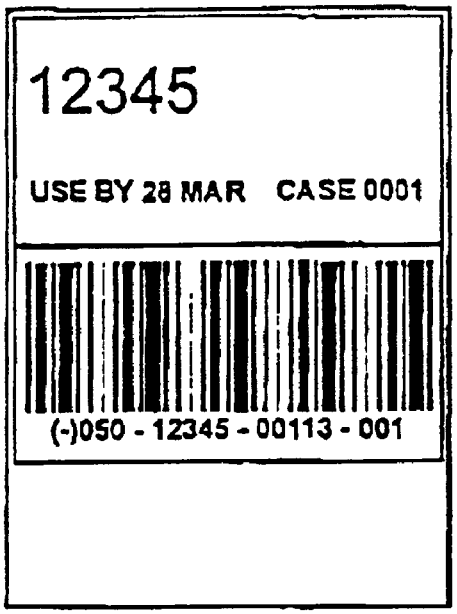
FIG. 14 shows a third written specification of the type shown in FIG. 11.

Specification 1103 is detailed in FIG. 14. At 1401 it is specified that the product number should be identified as text. At 1402 a use by date is identified taking the form day/month. At 1403 a case number is specified, taking the form "CASE" followed by four incrementing digits.

At 1404 a barcode is specified. This is a more complex barcode than those specified previously, taking a form that combines three independent types of information. In this specific example, the barcode represents the product number, the unit counter and the use by date. Further details of barcode technology is provided in U.S. Pat. No. 4,114,030.

An example of the graphical representation is then given at 1405.

Figure 15:
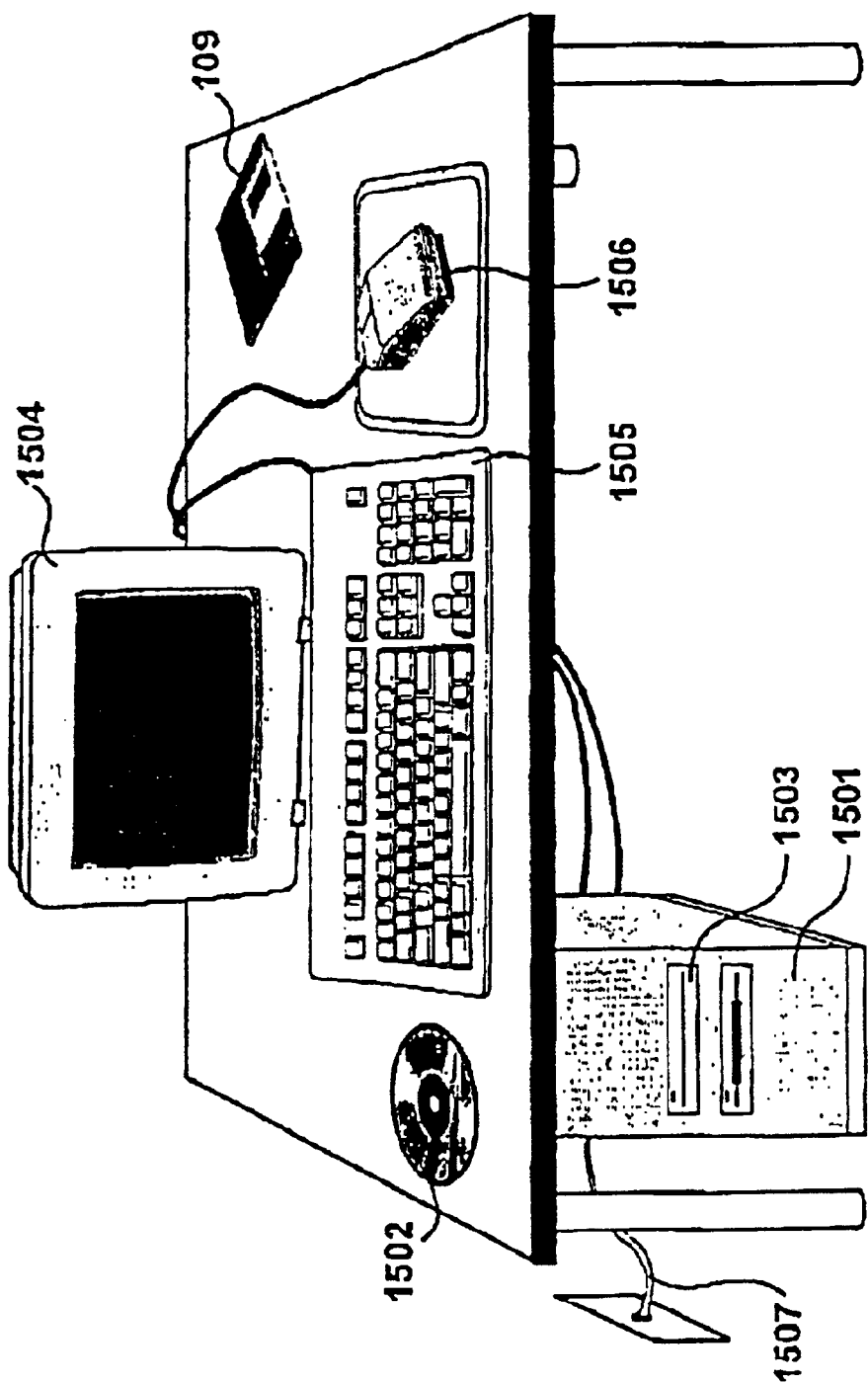
FIG. 15 illustrates a system for converting manually generated specifications into generic code files.

A system for converting manually generated specifications 1101 to 1103 into generic code files 1104,1106 and 1109 is shown in FIG. 15. A computer system 1501, such as a PC base system running Windows NT, initially receives program instructions via a CD ROM 1502, receivable within a CD ROM reader 1503. In response to these instructions, after installation, a graphical user interface is presented on a visual display unit 1504 and manual operations are defined via a keyboard 1505 and a mouse 1506.

After a generic code file has been generated, it may be supplied to supermarkets via a modem and telephone line 1507 connected to the Internet 108. Alternatively, the generic code file may be supplied to the supermarkets on disk 109.

Figure 16:
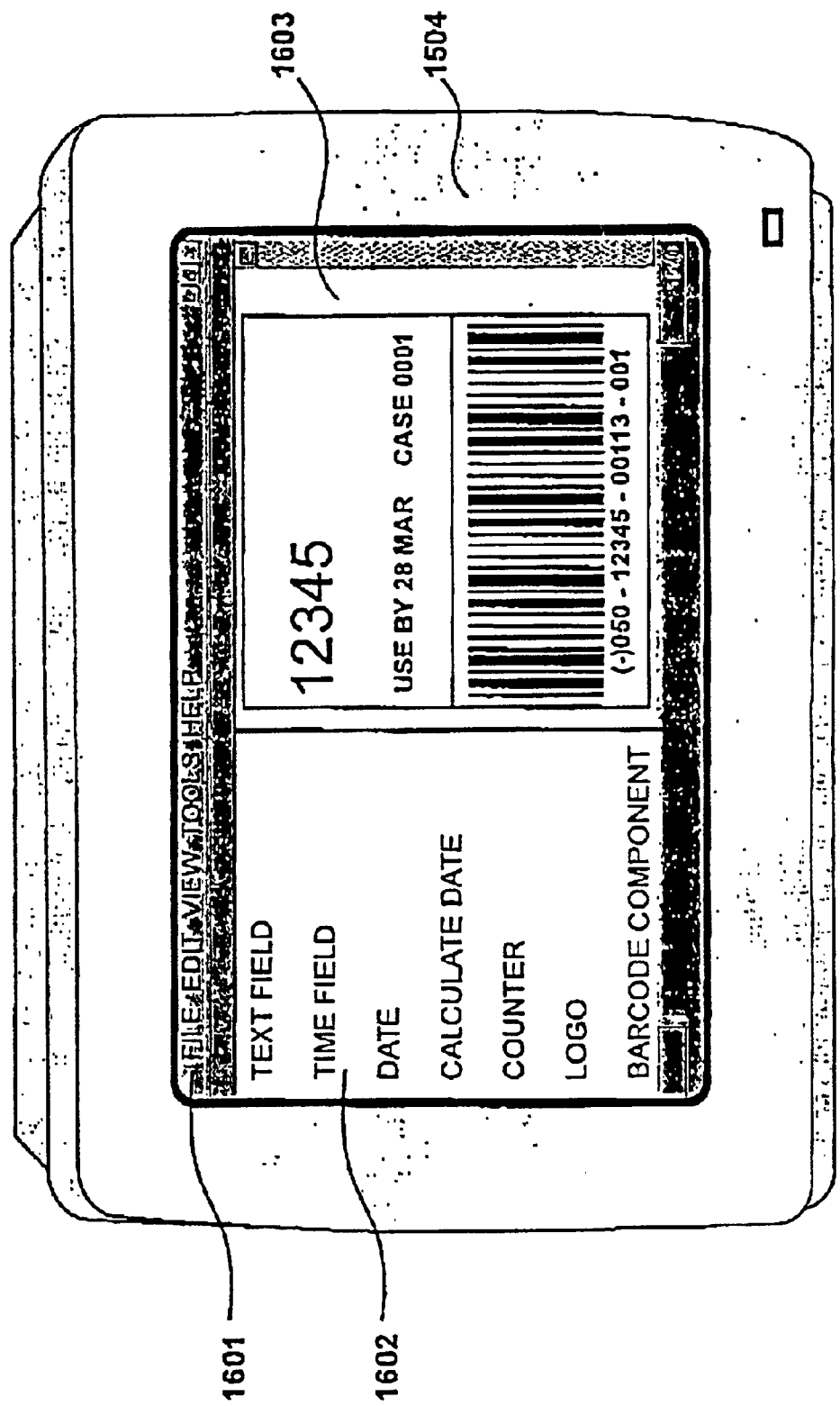
FIG. 16 details a graphical user interface of the type identified in FIG. 15.

The graphical user interface displayed on visual display unit 1504 is shown in FIG. 16. The interface comprises a conventional windows menu 1601, in combination with a function window 1602 and a display window 1603.

The function window identifies the types of functions that may be included within the label, these comprise of a text field, a time field, a date field, a date calculated field, a counter, a logo and a barcode component. When inserting these functions within a particular graphic, displayed in the display window 1603, the function is itself selected by operation of the mouse 1506, resulting in an item being added to the display window. Thereafter, further function related information may be entered either directly into the display window 1603 by operation of the keyboard 1505 or by the automatic generation of further windows or text boxes etc.

Each function selected from the function window 1602 by its application within the display window 1603 results in the generation of a field within the resulting generic code file. Thus, after manual operation to design a code graphic an example is graphically displayed in display window 1603 in a form as close as possible to the examples shown at 1203, 1305 and 1404. As this is done, the generic code files 1104, 1106 and 1109 are constructed in the form of a field of data, preferably consistent with extensible mark-up language (XML) standards.

The first stage generic code file 1104 is detailed in FIG. 17. At 1701 the file includes a header providing general information which, in this example, identifies the file as generic file 1104.

At 1702 there is provided a field for the use by date. The field is given a name by the statement FIELD "USEBY". This is followed by a statement to the effect that the field is of the date type by the statement .TYPE:DATE.

The date to be printed has an offset of ten identified by the statement .OFFSET:10 which means that the printed date is ten units ahead of a reference date.

The next statement identifies the units as day, taking the form .UNITS:DAYS. This is then followed by a statement concerning rounding identified as .ROUNDING:NONE. With no rounding, thus the actual day is always identified and is not modified in any way.

The next statement concerns a prompt at the coder itself. In this example it is identified as .PROMPT:NO, meaning that at the coder an operator would not be prompted for additional information.

A reference is identified by the statement .REF:CURRENTDATE, meaning that the reference date is the current date taken from a real-time clock.

A statement of the form .CALCULATE:YES means that the calculations should be performed by the coder itself if this functionality is available. Finally, additional print characteristics are provided, such as, for instance, the generation of a font and the positioning of the field.

At 1703 a field is included for the display until date. This is identified by .FIELD:"DISPLAYBY" and then by a statement identifying the date as a date type field, by the statement .TYPE:DATE.

The date to be printed has an offset of minus one identified by the statement .OFFSET:-1 which means that the printed date is ten units ahead of a reference date.

A rounding statement is included of the type .ROUNDING:MIDWEEK, to the effect that only dates lying between Monday to Friday are considered to be valid. Thus, if a date is calculated that falls on a Saturday or a Sunday, it is automatically readjusted to the preceding Friday.

The reference date is identified as the use by date, calculated for the previous field, by the statement .REF:"USEBY" and a statement of the type .CALCULATE:YES is included to specify that the calculation should be performed by the coder itself if possible. Finally, additional print characteristics are provided, such as, for instance, the generation of a font and the positioning of the field.

At 1704 there is a field for the inclusion of the price, identified by the statement .FIELD:"PRICE". This is followed by a type statement of the form .TYPE:TEXT. Thus, the coders do not have any appreciation of price and a price included as part of the code is merely considered as text. The source is then specified as .SOURCE:"1–99" so that the actual price to be coded is hard coded into the file itself. In more sophisticated systems, the source could include a pointer to a database or an internet URL. Finally, additional print characteristics are provided, such as, for instance, the generation of a font and the positioning of the field on the label.

The second stage generic code file 1106 is shown in FIG. 18. A header at 1801 identifies it as generic file 1106. Other information could be contained in this header, such as information relating to the particular product or its particular supplier etc.

At 1802 a field is defined by the statement .FIELD"NUMBER". In the system, numbers are considered to be examples of text, therefore the next statement identifies the type as being text, by taking the form .TYPE:TEXT. A source statement then identifies that a number is to be defined and in this example the number is hard coded. Alternatively, this number could be derived from a database. The field is then concluded by additional print characteristics are provided, such as, for instance, the generation of a font and the positioning of the field.

At 1803 a barcode field is defined by the statement .FIELD"BARCODE1". The barcode's type is identified by the statement .TYPE:BARCODE EAN 128. Its source is given by the statement .SOURCE:NUMBER, that is to say, the same number defined by field 1802. Thus, field 1802 defines the number of the product in text with field 1803 defining the number of the product by means of a barcode.

Field 1804 defines a use by date and initiates the field by the statement .FIELD"USEBY". This is followed by the type statement .TYPE:DATE.

This use by day must be consistent with the use by date included on the actual product therefore similar definitions are included, Thus, an offset is specified as ten by the statement .OFFSET:10 followed by a statement defining the units as .UNITS:DAYS. A rounding statement is included to the effect that no rounding is required, .ROUNDING:NONE and the field also states that a prompt is not required at the coder itself by the 'statement .PROMPT:NO. The reference is specified as the current date by the statement .REF:CURRENT DATE and a statement is included to the effect that the calculation is to be performed at the coder, in the form .CALC:YES. Finally, additional print characteristics are provided, such as, for instance, the generation of a font and the positioning of the field.

Field 1805 relates to the definition of a batch number. This is initiated by the statement .FIELD"BATCHNO" and a type statement of the form .TYPE:COUNTER. Thus, the intention of this counter is that it should increment after each assembly has been produced.

The counting step is identified as unity by the statement .STEP:1. This is then followed by a rollover statement which defines what is to happen at the end of the count. In this example, the count resets and this is specified by the statement .ROLLOVER:RESETATEND.

The next statement specifies the number of characters present in the coded count which is four in this example. Consequently, the statement takes the form .CHR:4.

The start count is specified by the next statement, taking the form .START:0001. The following statement specifies the end count.

Referring to the third stage specification, six articles are included in each case. Thus, the printing of the articles refers to them uniquely as one to six. Consequently, the count ends at six and this is defined by the statement .END:0006.

No prompt is required at the coder therefore this is identified by the statement .PROMPT:NO. If possible, the calculation is to be performed by the coder itself and this is specified by the statement .CALC:ATCODER. Finally, additional print characteristics are provided, such as, for instance, the generation of a font and the positioning of the field.

Third stage generic code file 1109 is detailed in FIG. 19. At 1901 a header identifies the file as generic file 1109 and is then followed by four coding fields 1902 to 1905.

At 1902 a number field is specified by the statement .FIELD"NUMBER". The field's type of text is then confirmed by the statement .TYPE:TEXT. A source for the text is then specified by the. statement SOURCE: followed by a hard-coded string, "12345" in this example. Finally, additional print characteristics are provided, such as, for instance, the generation of a font and the positioning of the field.

At 1903 a field for the use by date is specified by the statement .FIELD"USE BY" followed by the field type defined by the statement .TYPE:DATE. The use by date must be consistent with previous codes for this date therefore the coding instructions are substantially similar. Consequently, an offset of ten days is specified by the statements .OFFSET:10 and .UNIT:DAYS. No rounding is required and this is specified by the statement .ROUNDING:NONE. Again, no prompt is required, confirmed by the statement .PROMPT:NO. The reference is specified as the current date by the statement .REFERENCE:CURRENTDATE and a confirmation is made to the effect that the calculation should be done at the coder, by the statement .ATCODER:YES. Finally, additional print characteristics are provided, such as, for instance, the generation of a font and the positioning of the field.

At 1904 a field is included relating to the case number by the statement .FIELD"CASENUMBER" and the type taking the form .TYPE:COUNTER. The step size is specified as unity by the statement .STEPSIZE:1 and the rollover requirements is specified by the statement .ROLLOVER:RESETATEND.

The number of characters to be printed is specified as being four in this example, by the statement .CHAR:4, with the start value being specified at 0001 and the end value being specified at 0144 by the statements .START:0001 and .END:0144 respectively. The total number of cases represents the totality of the job. Thus, for this particular batch one hundred and forty-four traded units are being produced.

No prompt is required at the coder therefore the statement .PROMPT:NO is included and calculation is to be performed at the coder, confirmed by the statement .CALCULATE:ATCODER. Finally, additional print characteristics are provided, such as, for instance, the generation of a font and the positioning of the field.

A field for the barcode is included at 1905. The field is identified by the statement .FIELD"BARCODE" followed by type taking the form .TYPE:BARCODE EAN 128. The source of the barcode is specified by the statement .SOURCE:NUMBER+CASENUMBER+USEBY. The barcode may be considered as a composite barcode representing the product number derived from 1902, the case number derived from 1904 and the use by date derived from 1903.

A field confirms that the calculation is to be performed at the coder by the statement .CALCULATE:ATCODER and the field then includes additional print characteristics are provided, such as the positioning of the field.

Figure 20:
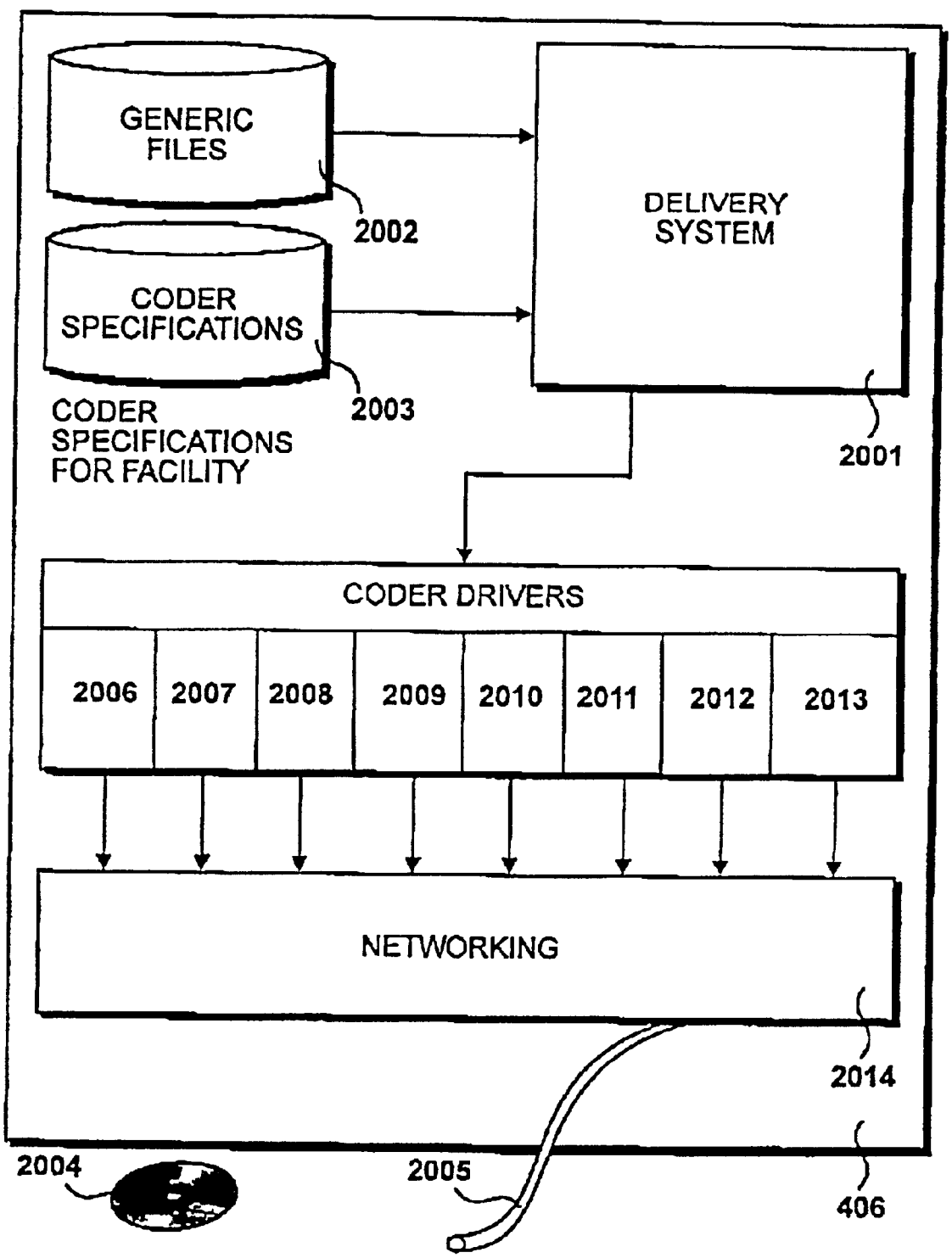
FIG. 20 details a delivery processing system of the type identified in FIG. 4.

Now that the generic code files have been generated they are supplied as generic image data 405 to the delivery processing system 406. The delivery processing system 406 is detailed in FIG. 20. The processing system includes a main delivery system 2001, a store of generic code files 2002 and a database of coder specifications 2003. The delivery system 2001 may take the form of a single computer system, such as system 615 shown in FIG. 6. Alternatively, in order to provide the required level of functionality, the delivery system 2001 may be implemented as a network of computer systems with the processing requirements being distributed throughout the network. The number of processing systems required in the facility will depend upon the number of coders present and upon the extent to which processing may be performed by the coder itself. Thus, it is possible that facility 103 includes modem sophisticated coders thereby reducing the requirement for additional processing capacity in order to implement the present preferred embodiment. Similarly, facility 104 may include many unintelligent coders such that the overall processing requirement in order to implement the present embodiment is significantly higher.

The delivery system 2001 operates under program instructions, initially received by means of a CD ROM 2004.

The delivery system 2001 receives a selection of generic files from store 2002 relating to the coding requirements of a particular batch. Coders 701, 706 and 709 receive coding instructions over a network connection 2005. For each operational coder, a delivery processing system executes a coder driver, such as drivers 2006, 20071 2006, 2009, 2010, 2011, 2012 and 2013. Each driver 2006 to 2013 submits instructions to its respective coder during an initialisation process, that is before any actual products or packages are coded. In some instances, particularly for sophisticated coding equipment, no further instructions are required until the batch has been completed, whereafter a further initialisation process will be required.

Instructions for initialisation may be substantially similar to instructions derived from a generic file. The instruction, at a higher level, may be merely passed on to the coder itself, via the driver, which then performs all necessary calculations in order to effect the coding operation.

In other situations, the coder will not include sufficient local functionality in order for it to interpret a high level code. Under these circumstances, the delivery system 2001 is aware that the coder lacks the required functionality by making reference to the relevant coder specification from database 2003. Consequently, additional processing may be performed by the delivery system 2001 resulting in the generation of lower level instructions which may then be passed on to the coder via its respective coder driver, a networking layer 2014 and the physical network connection 2005. Thus, in these circumstances, any gap present in the functionality of the coder itself is compensated or filled in by processing performed by the delivery system 2001 during the initialisation process.

In addition to additional processing functionality being required by the delivery system 2001, for an initialisation procedure, it is also possible that a coder driver, such as driver 2006, may need to provide additional instruction to the coder during the actual coding operation. In particular, further instructions may be required if the coder does not have a capability for calculating real-time dates or if the coder does have a capability for performing counts. Intervention on the part of a coder driver may also be required if composite barcodes are being generated.

Figure 21:
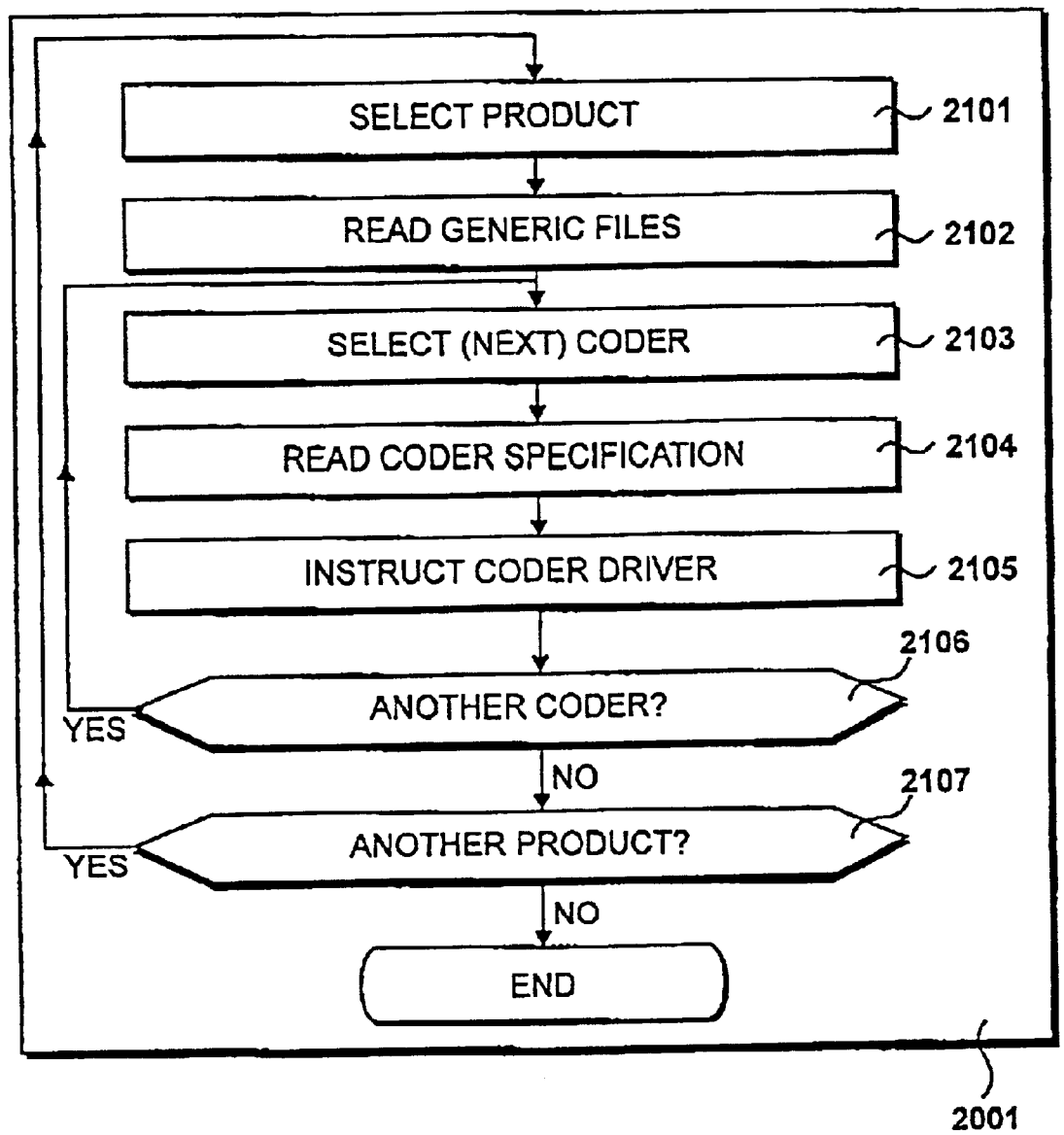
FIG. 21 details operations performed by the delivery system shown in FIG. 20.

Operations performed by the delivery system 2001, in response to instructions installed from CD ROM 2004, are detailed in FIG. 21.

At step 2101 a product for batch production on a particular line, such as line 601 shown in FIG. 6 is selected.

At step 2102 generic files for the product selected at step 2101 are read from the generic file store 2002.

At step 2103 a coder, such as the first coder 701, is selected and at step 2104 a specification for the coder selected at step 2104 is read from the coder specifications database 2003.

At step 2105 a coder driver, such as driver 2006, is instructed: whereafter, at step 2106, a question is asked as to whether another coder is to be considered.

After the first iteration, where a driver has been instructed for the first coder 701, the question asked at step 2106 will be answered in the affirmative, thereby returning control to step 2103. On this iteration, the next coder, the second coder 706, is selected resulting in the instruction of a further coder driver, such as driver 2007.

Again, for this particular line, the question asked at step 2106 will be answered in the affirmative, resulting in the third coder 709 being selected at step 2103. Again, its specification will be read and a coder driver, such as driver 2008, will be instructed. This will have then instructed drivers for all of the coders in the line, such that the question asked at step 2106 will be answered in the negative.

A question is then asked at step 2107 as to whether another product is considered and when answered in the affirmative control is returned to step 2101 and the process is repeated for the next selected product line. If the question asked at step 2107 is answered in the negative, the process terminates.

Figure 22:
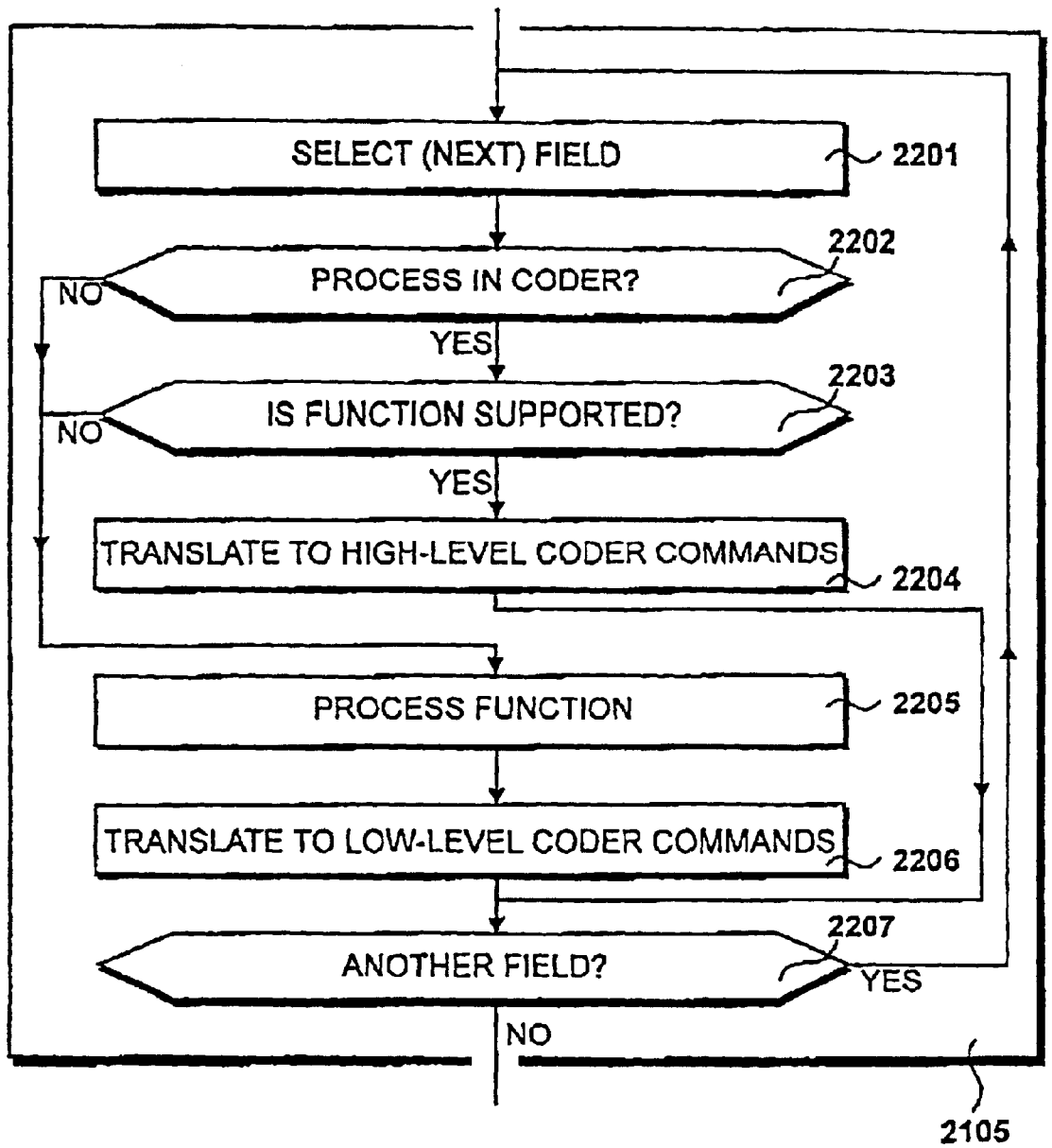
FIG. 22 details the process for constructing a coder driver of the type identified in FIG. 21.

Process 2105 for the instruction of a coder driver is detailed in FIG. 22.

Referring to the generic file read at step 2102 and then selected at step 2103, a field is selected at 2201, such as filed 1702 of generic file 1104 shown in FIG. 17.

At step 2202 a question is asked as to whether field calculations are to be processed in the coder itself and when answered in the negative, control is directed to step 2205. When answered in the affirmative, control is directed to step 2203 where a question is asked as to whether the function is supported by the coder concerned. The question asked at step 2202 refers to the generic file and asks whether it was the designer's intention that the calculation should be performed by the delivery system or by the coder itself. Thus, this is exclusively the domain of the generic file. This is different from the question asked at step 2203, which relates exclusively to the coder specification. Thus, it is possible that a designer had the intention for calculations to be performed locally on the coder, which is usually the preference, but in its implementation it is possible that a coder cannot support the particular function.

If the question asked at step 2203 is answered in the affirmative, to the effect that the coder does have the functionality, the generic instruction is translated into a high level coder command at step 2204. This translation requires minimal processing on the part of the delivery system 2001 and merely reflects the preferred syntax of the coder commands.

If it was the intention of the original designer that the process should not be performed at the coder or if the coder cannot support the function, the function is processed at the delivery system at step 2205. At step 2206 the processed information is then translated into low level coder commands at step 2206. Thus, processing step 2205 and translating step 2206 require considerably more processing input on the part of the delivery system 2201 and would generally result in a requirement for more data to be conveyed to the coder itself. Thus, this ensures that a gap in functionality on the part of the coder itself can be filled in by additional processing power implemented at the delivery system 2001.

The capabilities of coders vary, therefore it is possible that additional processing may be required for one selected field, but for another selected field it may be possible for the processing to be done locally by the coder.

After translating commands for a field, a question is asked at step 2207 as to whether another field is to be processed and when answered in the affirmative control is returned to step 2201. Eventually, all of the field present within the file will have been processed and the question asked at step 2207 will be answered in the negative.

Internal processing capabilities for coders 701, 706 and 709 are detailed in FIG. 23. Particular functions relate to the generation of dates, the generation of product counts, the generation of barcodes and the generation of fonts. For each of these, it is possible for each coder to have three levels of functionality. Level one represents the highest level of functionality, level two represents an intermediate level of functionality and level three represents the lowest level of functionality.

If a date can be calculated to the first level of functionality, the coder has an internal real-time clock and dates can be deduced by means of an offset and then printed. If the coder has the second level of functionality for dates, it is possible to print a date from a character string. If only level three functionality is provided for dates, it is necessary to provide a bitmap to the coder in order for it to generate a graphical representation of the date. All level three capabilities take this form in that It is only possible to supply the information as a bitmap.

For the auto-numbering functionality, if level one functionality is provided it is possible for the coder itself to auto-number. With level two functionality it is possible for the coder to print a number in response to receiving a character string. Alternatively, at level three a bitmap must be provided.

For barcode functionality, level one functionality means that a coder can assemble barcode details internally from its own calculations and then generate an image with reference to its own knowledge of the barcode symbology.

With level two functionality, a coder is aware of barcode symbology and can print a code in response to receiving a character string. However, it cannot generate these strings internally. As previously stated, level three functionality means that the coder must be provided with a bitmap.

In terms of printing fonts, level one functionality means that fonts may be specified as occupying any location within the printable area. Under level two functionality it is only possible for fonts to be printed inline and any other orientation requires a bitmap to be supplied. As previously stated, level three functionality means that the coder is only responsive to bitmaps.

In the present example, the first coder is required to code two dates and a text string representing price. As shown in FIG. 23, the first coder has level one functionality for dates and level two functionality for fonts. In terms of the price coding, the font is inline therefore the level two functionality is sufficient. Consequently, all of the processing may be done by the coder itself and no additional gap filling is required on the part of the delivery system. This is important for coding individual consumer products because the speed of the coding operation is relatively high and it is undesirable for the coding operation to be held up while information is received from the delivery system. Consequently, it is desirable for information to be received from the delivery system 2001 only during an initialisation process.

In the example, the second coder 706 is required to code the product number as text and to code the product as a barcode. In addition, it is required to code a use by date and batch number.

Referring to FIG. 23, the coder only has level two functionality for the printing of dates. Consequently, it is necessary for the delivery system 2001 to perform the real-time date calculation and for this information to be then conveyed to the coder as a text string. In addition, the coder driver must also perform an ongoing real-time operation to the effect that the date may need to be changed if the packaging process continues through midnight or over a plurality of days.

The second coder has level two functionality for the printing of barcodes therefore the barcode is rendered locally at the coder in response to receiving a product string. However, the coder only has level three functionality in terms of fonts therefore for the coding of the product number in text, it is necessary for the rendering to be performed by the delivery system 2001 and then downloaded to the coder as a bitmap.

The coder is also required to print a batch number. In this respect the coder has level two functionality and can print the phrase "LOT" followed by a four digit number. However, it has no internal calculating mechanism and details of the four digit number must be downloaded as a string. Consequently, further additional processing is required on the part of the delivery system.

It can be seen that the second level coder is relatively poorly equipped and much processing is required on the part of the delivery system. This is not uncommon for coders of this type but may be required to code a wide range of graphics onto large areas of cardboard boxes. However, the cardboard boxes tend to be relatively large, containing many individual consumer products, therefore the real-time constraints upon such coders are substantially less than the real-time constraints placed on the first level coders. Thus, it is possible for the real-time data to be calculated by the coder drivers in response to interrogations made by these drivers.

In theory, It would be possible for the drivers to respond to interrupts but given the low functionality of the coders that they are interfaced to, it is unlikely that the coders would include functionality themselves for generating the required interrupt signals. Consequently, a further burden is placed on the coder drives in that they must continually interrogate their respective coder, say once per second, to determine their status and, when required, download further instructions over the network connection 2005.

In this respect, it should be appreciated that having coders with internal functionality allows the functionality of the delivery system to be employed elsewhere; therefore it is possible for an overall system designer to exercise a degree of balancing in order to optimise the availability of distributed processing capability.

The third coder 709 takes the form of a sophisticated thermal transfer coder and is provided with much internal functionality. In particular, its functionality for dates, counters, barcodes and fonts is all at the level one standard. It is required to print the product number as text and to include a use by date in a particular form. It is also required to print a case number and to include a sophisticated barcode incorporating the product number, the unit counter and the use by date. All of this functionality is provided internally by the coder itself therefore it is only necessary for the delivery system to convey the information received from the third stage generic code file 1109 during an initialisation process whereafter the sophisticated coding operations required by the coder are performed internally without requiring any further assistance from its driver 2008.

The following shows an example of generic code defining a date field.

```
<Field Name="Field00">
    <FldType>DateText</FldType>
    <CLSID> . . . etc . . . </CLSID>
    <Displayed>1</Displayed>
    <X>0</X> <Y>0</Y>
    <W>60</W> <H>7</H> <Ln>1</Ln>
    <Orientation>0</Orientation>
    <OverrideThis>1</OverrideThis>
        <Inverse>0</Inverse> <Mirror>0</Mirror>
    <RenderMode>OR</RenderMode>
    <CalcData>31/10/2000</CalcData>
```

```
<Data>
    <Object Index="0" Static="0" Parse="1">
        <DataType>2</DataType>
        <Default>dd'/'MM'/'yyyy</Default>
    </Object>
</Data>
<Text>
    <Font>
        <Face>Domino A-Series (7 Dot)
            </Face>
        <Family>Modern</Family>
            <Pitch>7</Pitch>
        <XMag>100</XMag> <YMag>100</YMag>
            <TTSize>0</TTSize>
        </Font>
        <Bold Weight="1">0</Bold>
        <Italic>0</Italic>
        <DblSpace>0</DblSpace>
    </Text>
</Field>
```

The following messages are sent to a coder that supports the specified date field functionality. In this example, the contents of the printed information for a date field are represented as ASCII characters in the form suitable for a Domino A300 coder.

| 02 | 00 | 00 | 00 | 00 | 2b | 00 | 31 | 00 | 01 | 00 | 1b | 00 | 69 | 01 | 1b | 00 | 6f | 00 |
| 00 | 00 | 00 | 00 | 00 | 1b | 00 | 69 | 01 | 1b | 00 | 77 | 00 | 41 | 30 | 2f | 00 | 1b | 00 |
| 77 | 00 | 46 | 30 | 2f | 00 | 1b | 00 | 77 | 00 | 45 | 30 | 63 | 05 | | | | | |

In response to receiving these instructions the coder would return the following;

| 02 | 00 | 00 | 00 | 00 | 02 | 00 | 31 | 40 | 75 | 00 |

The following represents messages sent to a coder that does not support the specified date field but does support the downloading of text. In this example, the information would be appropriate for a Zebra thermal transfer printer.

^FT102, 316^A0N, 61^FD23/02/2001^FS

The following represents an example of generic code for the coding of a counter onto a product.

```
<Field Name="Field01">
    <FldType>CounterText</FldType>
```

```
<Data>
    <Object Index="0" Static="1" Parse="0">
        <DataType>4</DataType>
            <Locale>en-GB</Locale>
            <MaxNoOfChars>0</MaxNoOfChars>
            <Default>0000</Default>
            <CurDataVal>0000</CurDataVal>
        <CounterText>
            <Rollover>1</Rollover>
                <PrnPerCnt>1</PrnPerCnt>
            <ResetOnSel>StartValue</ResetOnSel>
            <StartVal>0</StartVal>
            <EndVal>9999</EndVal>
            <StepSize>1</StepSize>
                <Prompt>Lot Counter
                    </Prompt>
                <PromptAtCoder>0</PromptAtCoder>
            </CounterText>
        </Object>
    </Data>
<Text>
    <Font>
        <Face>Domino A-Series(7 Dot)
        </Face>
        <Family>Modern</Family>
            <Pitch>7</Pitch>
```

```
        <XMag>100</XMag>
            <YMag>100</YMag>
        <TTSize>0</TTSize>
    </Font>
    <Bold Weight="1">0</Bold>
    <Italic>0</Italic>
    <DblSpace>0</DblSpace>
</Text>
</Field>
```

The following is an example of messages sent to a coder that does support counter functionality.

Data is represented as hexadecimal characters, information provide for a Domino-A300 Coder.

Message to define the contents of the product (1 counter field)

| 02 | 00 | 00 | 00 | 00 | 29 | 00 | 31 | 00 | 01 | 00 | 1b | 00 | 69 | 01 | 1b | 00 | 69 | 01 |
| 1b | 00 | 78 | 31 | 4e | 04 | 30 | 30 | 30 | 30 | 39 | 39 | 39 | 39 | 30 | 30 | 30 | 30 | 31 |
| 59 | 53 | 00 | 41 | 00 | 5a | 00 | 00 | 00 | 4e | 30 | a7 | 06 | | | | | | |

In response to receiving these instructions the coder would return the following:

| 02 | 00 | 00 | 00 | 00 | 02 | 00 | 31 | 40 | 75 | 00 |

Message to reset the machine 'products printed' counter to zero

```
<CLSID> ... etc ... </CLSID>
<Displayed>1</Displayed>
<X>0</X> <Y>0</Y>
<W>24</W> <H>7</H> <Ln>1</Ln>
<Orientation>0</Orientation>
<OverrideThis>1</OverriderThis>
<Inverse>0</Inverse>
    <Mirror>0</Mirror>
    <RenderMode>OR</Rendermode>
    <CalcData>0000</CalcData>
```

```
>>
02  00  00  00  00  0a  00  40  00  00  00  00  00  00  00  00  00  4c  00
<<
02  00  00  00  00  0a  00  40  40  00  00  00  00  00  00  00  00  8c  00
```

The following represents a portion of generic code relating to the printing of a barcode.

<Field Name="Field01">
  <FldType>BarcodeText</FldType>
  <CLSID>{ ... etc ... }</CLSID>
  <Displayed>1</Displayed>
  <X>0</X> <Y>0</Y>
  <W>124</W> <H>7</H> <Ln>1</Ln>
  <Orientation>0</Orientation>
  <OverrideThis>1</OverrideThis>
  <Inverse>0</Inverse>
  <Mirror>0</Mirror>
  <RenderMode>OR</RenderMode>
  <CalcData>5030159003930</CalcData>
  <Data>
    <Object Index="0" Static="1" Parse="0">
      <DataType>5</DataType>
      <Locale>en-GB</Locale>
      <MaxNoOfChars>12</MaxNoOfChars>
      <Default>5030159003930</Default>
    </Object>
  </Data>
  <Barcode>
    <Mag>798</Mag>
    <BcMaxChars>13</BcMaxChars>
    <BcFixedLen>1</BcFixedLen>
    <BcH>50</BcH>
  <HR>
    <HRDisplayed>1</HRDisplayed>
    <HRPos>Below</HRPos>
    <HRFont>
      <Face>OCR-B</Face>
      <Family>OCR</Family>
      <Pitch>7</Pitch>
      <XMag>100</XMag>
      <YMag>100</YMag>
      <TTSize>0</TTSize>
    </HRFont>
  </HR>
  <CheckDigit>0</CheckDigit>
  <QuietMargin>1</QuietMargin>
  <EAN13>
    <GuardBars>1</GuardBars>
  </EAN13>
  </Barcode>
</Field>

The following represents examples of commands sent to a coder that does support barcode functionality.

Data is represented as hexadecimal characters, information provided for a Domino-A300 Coder.

```
02 00 00 00 00 46 00 31 00 01 00 1b 00 69 01 1b 00 66 35
00 30 00 33 00 30 00 31 00 35 00 39 00 30 00 30 00 33 00
39 00 33 00 1b 00 71 01 03 02 0a 0a 01 02 03 04 00 00 00
00 00 00 00 00 1b 00 72 00 20 00 20 00 20 00 1b 00 6c 01
00 0d 00
```

In response to receiving these instructions the printer would return the following:

```
02   00   00   00   00   02   00   31   40   75   00
```

The following represents an example of instructions for submitting a bitmap in preference to a barcode.

<ESC>GTMP,168,8,N038E0,EH0EJ038E0,::::EH0E03F038E07C,EH0E 07F838E1HF,EH0E0E1C38E3C780IFE1C1E38E38380IFE380E38E701C0 EH0E380E38E701C0EH0E3HFE38E701C0:EH0E38H038E701C0::EH0E1C0238E38380EH0E1E0E38E3C780EH0E07FE38E1HF,EH0E03F838E07C<EOT>

Use bitmap on Image

<ESC>ITMP,X102,Y209<E0T>

What is claimed is:

1. Apparatus for applying graphical information onto packaged consumer products, in which said products are packed individually and then further packed into groups of products, said apparatus comprising:

a plurality of coders which apply graphical information to product packaging in response to received instructions, a processing system which generates said instructions in response to received input data representing said graphical information;

wherein a first of said coders is capable of performing a specific function and a second of said coders is incapable of performing said specific function, and on receipt of input data requiring said specific function to be performed, said processing system refers to capabilities of said coders to perform said specific function, and in dependence of said capabilities said processing system:

(a) instructs said first coder to generate said graphical information such that said first coder performs said specific function; and (b) performs said required specific function before supplying lower level instructions to said second coder.

2. Apparatus as claimed in claim 1, wherein said specific function comprises calculating a date from said input data.

3. Apparatus as claimed in claim 2, wherein said date is a sell by date or a use by date.

4. Apparatus as claimed in claim 1, wherein said specific function comprises generating a character string from data representing a date.

5. Apparatus as claimed in claim 1, wherein said specific function comprises calculating a date from said input data and generating a bitmap representing said date.

6. Apparatus as claimed in claim 1, wherein said specific function comprises incrementing a number to be coded onto said packaging.

7. Apparatus as claimed in claim 1, wherein said specific function comprises incrementing a number to be coded onto said packaging and generating a bitmap representation of said number.

8. Apparatus as claimed in claim 1, wherein said specific function comprises generating a character string from input data representing a barcode.

9. Apparatus as claimed in claim 1, wherein said specific function comprises generating a bitmap representing a barcode from said input data.

10. Apparatus as claimed in claim 1, wherein said input data comprises an instruction to code text using a font, and said specific function comprises generating a bitmap representation of said text.

11. Apparatus as claimed in claim 1, wherein said input data comprises an instruction to code text using a font, said processing system is configured to examine the orientation of said font, and said specific function comprises generating a bitmap representation of said text at said specified orientation.

12. Apparatus as claimed in claim 1, wherein, said input data comprises generic coding data and said processing system converts said generic coding data into coder specific data.

13. Apparatus as claimed in claim 1, wherein said specific function comprises at least one of functions (a) to (e) wherein function:

(a) comprises incrementing a numerical counter;
(b) comprises generating graphic data representing a barcode from a character string;
(c) comprises calculating a character string representing a barcode;
(d) comprises calculating a date; and
(e) comprises generating a character string representing a date.

14. Apparatus as claimed in claim 1, wherein one of said coders applies said information to printed packaging of a consumer product.

15. Apparatus as claimed in claim 1, wherein said consumer product is a perishable food item.

16. Apparatus as claimed in claim 1, wherein said consumer products are prepared meals.

17. Apparatus as claimed in claim 1, wherein one of said coders applies said information to a package of a consumer product and another one of said coders applies said information to an assembly of product packages.

18. Apparatus as claimed in claim 17, wherein a third coder applies a code to a packaged unit having a plurality of said assemblies packed therein.

19. A method of applying graphical information onto packaged consumer products, in which said products are packed individually and then further packed into groups of products, and a plurality of coders apply graphical information to product packaging in response to instructions received from a processing system wherein a first of said coders is capable of performing a specific function and a second of said coders is incapable of performing said specific function, said method comprising the steps of:

receiving input data representing graphical information to be coded onto product packaging;

generating said instructions in response to said input data and with reference to capabilities of said coders to perform said specific function, such that on receipt of input data requiring said specific function to be performed, said processing system:

(a) instructs said first coder to generate said graphical information such that said first coder performs said specific function; and
(b) performs said specific function before supplying lower level instructions to said second coder.

20. A method according to claim 19, wherein said specific function comprises calculating a date from said input data and generating a character string representing said date.

21. A method according to claim 19, wherein said specific function comprises calculating a date from said input data and generating a bitmap representing said date.

22. A method according to claim 19, wherein said specific function comprises incrementing a number to be coded onto said packaging and generating a bitmap representation of said number.

23. A method according to claim 19, wherein said specific function comprises incrementing a number to be coded onto said packaging and generating a bitmap representation of said number.

24. A method according to claim 19, wherein said specific function comprises generating a character string from input data representing a barcode.

25. A method according to claim 19, wherein said specific function comprises generating a bitmap representing a barcode from said input data.

26. A method according to claim 19, wherein said specific function comprises at least one of functions (a) to (e) wherein function:

(a) comprises incrementing a numerical counter;
(b) comprises generating graphic data representing a barcode from a character string;
(c) comprises calculating a character string representing a barcode;
(d) comprises calculating a date; and
(e) comprises generating a character string representing a date.

27. A computer-readable medium having computer-readable instructions executable by a computer such that, when executing said instructions, a computer will perform the steps of:

receiving input data representing graphical information to be coded onto product packaging;

generating instructions in response to said input data and in dependence of capabilities of coders to perform a specific function, such that on receipt of input data requiring said specific function to be performed, said computer will:

(a) instruct a first coder which is capable of performing said specific function to generate said graphical information such that said first coder performs said specific function; and
(b) perform said specific function before supplying lower level instructions to a second coder which is incapable of performing said specific function.

28. A computer-readable medium having computer-readable instructions according to claim 27, such that when executing said instructions a computer will assist in the generation of a date, an incremental count or a barcode.

* * * * *

UNITED STATES PATENT AND TRADEMARK OFFICE
CERTIFICATE OF CORRECTION

PATENT NO. : 6,732,928 B1
DATED : May 11, 2004
INVENTOR(S) : Paul Lawlor

It is certified that error appears in the above-identified patent and that said Letters Patent is hereby corrected as shown below:

Title page,
Item [73], Assignee, "Clarion Limited" should be -- Claricom Limited --.

Column 24,
Lines 21-22, after "packaging" delete "and generating a bitmap representation of said number.".

Signed and Sealed this

Sixth Day of September, 2005

JON W. DUDAS
*Director of the United States Patent and Trademark Office*